United States Patent
Van Thillo et al.

(10) Patent No.: US 9,004,663 B2
(45) Date of Patent: Apr. 14, 2015

(54) INKJET PRINTING METHODS AND INK SETS

(71) Applicant: Agfa Graphics NV, Mortsel (BE)

(72) Inventors: Etienne Van Thillo, Essen (BE); Frank De Voeght, Heist o/d Berg (BE)

(73) Assignee: Agfa Graphics NV, Mortsel (BE)

( * ) Notice: Subject to any disclaimer, the term of this patent is extended or adjusted under 35 U.S.C. 154(b) by 0 days.

(21) Appl. No.: 13/872,251

(22) Filed: Apr. 29, 2013

(65) Prior Publication Data

US 2013/0235114 A1    Sep. 12, 2013

Related U.S. Application Data

(62) Division of application No. 12/518,328, filed as application No. PCT/EP2007/062705 on Nov. 22, 2007, now Pat. No. 8,480,203.

(60) Provisional application No. 60/885,498, filed on Jan. 18, 2007.

(30) Foreign Application Priority Data

Dec. 21, 2006    (EP) ..................................... 06126903

(51) Int. Cl.
| | | |
|---|---|---|
| B41J 2/17 | (2006.01) | |
| B41J 2/01 | (2006.01) | |
| B41J 2/175 | (2006.01) | |
| B41J 2/21 | (2006.01) | |
| B41M 5/00 | (2006.01) | |
| C09D 11/101 | (2014.01) | |
| C09D 11/322 | (2014.01) | |
| C09D 11/40 | (2014.01) | |
| B41M 7/00 | (2006.01) | |

(52) U.S. Cl.
CPC .. *B41J 2/01* (2013.01); *B41J 2/175* (2013.01); *B41J 2/17503* (2013.01); *B41J 2/2107* (2013.01); *B41J 2/211* (2013.01); *B41M 5/0023* (2013.01); *B41M 7/0072* (2013.01); *C09D 11/101* (2013.01); *C09D 11/322* (2013.01); *C09D 11/40* (2013.01)

(58) Field of Classification Search
USPC ............ 347/96, 98, 99; 430/281.1; 106/31.49
See application file for complete search history.

(56) References Cited

U.S. PATENT DOCUMENTS

| | | | |
|---|---|---|---|
| 6,412,934 B1 * | 7/2002 | Moriyama et al. | 347/96 |
| 7,141,104 B2 * | 11/2006 | De Voeght et al. | 106/31.49 |
| 7,700,263 B2 * | 4/2010 | Overend et al. | 430/281.1 |

OTHER PUBLICATIONS

Van Thillo et al.: "Inkjet Printing Methods and Ink Sets"; U.S. Appl. No. 12/518,328, filed Jun. 9, 2009.
Vanmaele et al.: "3D-Inkjet Printing Methods"; U.S. Appl. No. 12/518,331, filed Jun. 9, 2009.
Van Thillo et al.: "White Inkjet Ink Improved for Dispersion Stability"; U.S. Appl. No. 12/518,340, filed Jun. 9, 2009.
De Voeght et al.: "Inkjet Printing Methods and Inkjet Ink Sets"; U.S. Appl. No. 12/518,338, filed Jun. 9, 2009.

* cited by examiner

*Primary Examiner* — Lam Nguyen
(74) *Attorney, Agent, or Firm* — Keating & Bennett, LLP

(57) ABSTRACT

An inkjet printing method includes, in order, the steps of a) providing to an inkjet printer at least two or more colorless liquids having a different composition and at least one color inkjet ink; b) mixing the color inkjet ink in a controlled amount with the two or more colorless liquids; and c) printing the ink-mixture of the color inkjet ink and the two or more colorless liquids with the inkjet printer onto an ink-receiver.

12 Claims, 3 Drawing Sheets

INKJET PRINTING METHODS AND INK SETS

CROSS-REFERENCE TO RELATED APPLICATIONS

This application is a 371 National Stage Application of PCT/EP2007/062705, filed Nov. 22, 2007. This application claims the benefit of U.S. Provisional Application No. 60/885,498, filed Jan. 18, 2007, which is incorporated by reference herein in its entirety. In addition, this application claims the benefit of European Application No. 06126903.1, filed Dec. 21, 2006, which is also incorporated by reference herein in its entirety.

BACKGROUND OF THE INVENTION

1. Field of the Invention

The present invention relates to inkjet printing methods and inkjet ink sets wherein the inks are jetted upon different types of ink-receivers.

2. Description of the Related Art

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

When jetting the inkjet ink onto an ink-receiver, the ink typically includes a liquid vehicle and one or more solids, such as dyes or pigments and polymeric binders. It will be readily understood that the optimal composition of such ink is dependent on the printing method used and on the nature of the ink-receiver to be printed. The ink compositions can be roughly divided in:

- water-based, the drying mechanism involving absorption, penetration and evaporation;
- solvent-based, the drying primarily involving evaporation;
- oil-based, the drying involving absorption and penetration;
- hot melt or phase change, in which the ink is liquid at the ejection temperature but solid at room temperature and wherein drying is replaced by solidification; and
- UV-curable, in which drying is replaced by polymerization.

It should be clear that the first three types of ink compositions are more suitable for a receiving medium that is more or less absorptive, whereas hot melt inks and UV-curable inks are usually printed on non-absorbent ink-receivers.

However the behavior and interaction of a UV-curable ink on a substantially non-absorbing ink-receiver was found to be quite complicated compared to water-based inks on absorbent ink-receivers. In particular, a good and controlled spreading of the ink on the ink-receiver proved to be problematic and adhesion problems were sometimes observed on using different types of non-absorbing ink-receivers. The same problems have been observed when solvent based inkjet inks including a binder were jetted on different types of non-absorbing ink-receivers.

One way to approach these problems is to develop and use different ink sets for different types of substrates, but this is a not a preferred solution since changing inks in the printer and print head is very time consuming and not really a viable solution for an industrial printing environment. Therefore, the general approach is to modify the surface chemistry of the ink-receiver either with a suitable surface layer coating or by a pre-treatment such as plasma or corona treatment.

Corona discharge treatment and plasma treatment increase the cost, complexity and maintenance of the equipment used to process the substrates. Substrates may contain significant impurities or irregularities that may interfere with the treatment of the substrate, and hence not result to the uniform spreading and adhesion of ink.

The other possibility of using the same inkjet ink set on different ink-receivers by application of a surface layer prior to jetting also increases the complexity of the inkjet printer. Generally, the surface layer is coated and dried or cured before jetting the inkjet ink as, for example, in the inkjet printing process in EP 1671805 A (AGFA) and US 2003/0021961 (3M), but it can also remain a wet, un-cured surface layer as in WO 00/30856 (XAAR)

A single composition of a surface layer suitable for all the different substrates is however not available. WO 2006/111707 (SUN CHEMICAL) discloses a process of ink jet printing in which: i) a primer is applied to a substrate material; ii) ink is ink jet printed onto the primed substrate; iii) a characteristic relating to print quality is evaluated; iv) the composition of the primer is adjusted in dependence on the evaluated characteristic relating to print quality; and v) the adjusted primer composition is applied to the substrate material and ink is ink jet printed onto the primed substrate material to give a printed product. Surface layers increase the thickness of an ink-layer, which may result in a different look-and-feel and reduced flexibility of the ink-layer.

Inkjet printing methods wherein inkjet inks are mixed with colorless liquids just prior to jetting have also been investigated.

U.S. Pat. No. 6,550,892 (KODAK) discloses a drop-on-demand ink jet printing system for delivering droplets of selectable-color ink to a receiver by mixing a colorless liquid ink with liquid inks of a different color and delivering the ink-mixture to the ejection chamber of a print head. Also U.S. Pat. No. 6,050,680 (CANON) relates to an ink jet recording apparatus that can record images with a plurality of inks with different densities for each color by mixing of a first ink containing colorant and a second ink containing no colorant.

U.S. Pat. No. 6,464,336 (KODAK) discloses a drop-on-demand ink jet printing system for delivering droplets of selectable-color ink to a receiver by mixing of a colorless ink, a dye ink and a bleach solution.

Instead of mixing colored inks, U.S. Pat. No. 4,614,953 (LAITRAM) discloses a color ink jet printing mechanism utilizing a single stream flow of ink by injecting solid dyes into a carrier fluid to form colored ink. The mechanism is capable of a wider range of color tonalities, due to the pre-mixing capabilities, than is possible using dithering techniques with three colored inks.

All these inkjet printing methods are concerned with enhancing the color gamut by jetting color ink diluted with different amounts of a colorless liquid, but are silent on how ink-mixtures should be made for printing on different ink-receivers.

It would be desirable to be able to print inkjet inks with consistent image quality on a wide variety of ink-receivers using a state-of-the-art inkjet printer not requiring any complex or costly adaptation of the printer.

Printing on a wide variety of different ink-receivers, including non-absorbing substrates such as glass, metal or polymeric surfaces, may deliver inconsistent image quality and adhesion problems of the ink to some of the ink-receivers. A change of substrate then necessitates a cumbersome change of inkjet ink sets, a second inkjet printer or some pre-treatment installation of the substrate, which are all not desirable for reasons of productivity.

SUMMARY OF THE INVENTION

In order to overcome the problems described above, preferred embodiments of the present invention provide inkjet ink sets and inkjet printing methods capable of handling a wide variety of different types of substrates using a state-of-the-art inkjet printer without compromising on the consistency of image quality, physical properties, such as adhesion of the image to the substrate, and productivity.

Further preferred embodiments of the present invention will become apparent from the description hereinafter.

Optimization of image quality or physical properties by mixing of inkjet inks with a colorless liquid just prior to jetting causes changes in the colorant concentration leading to differences in color gamut and image quality if no time-consuming adaptations to the color management of the inkjet printer are made.

It has been discovered that it was possible to obtain consistent image quality and improved physical properties on a variety of ink-receivers by printing with ink-mixtures of a color inkjet ink and two or more colorless liquids in a fixed ratio, wherein the mixture of the colorless liquids was altered depending on the ink-receiver.

Another preferred embodiment of the present invention is an inkjet printing method including in order the steps of: a) providing to an inkjet printer at least two or more colorless liquids having a different composition and at least one color inkjet ink; b) mixing the color inkjet ink in a controlled amount with the two or more colorless liquids; and c) printing the ink-mixture of the color inkjet ink and the two or more colorless liquids with the inkjet printer onto an ink-receiver.

Another preferred embodiment of the present invention is a color inkjet ink set including two or more colorless liquids having a different composition and a color inkjet ink.

It was also found possible to improve the stability of a pigmented inkjet ink by distributing two or more less compatible compounds over the color inkjet ink and/or the two or more colorless liquids. For example in radiation curable inks, the photo-initiator may be included into the color inkjet ink, while the polymerization synergist and the inhibitor are included into the two or more colorless liquids. In this manner, stable radiation curable inkjet inks exhibiting higher curing speed can be prepared.

Another advantage was that the viscosity of the inkjet ink can not only be controlled by the jetting temperature of the print head but also with a first colorless liquid having a higher viscosity and a second colorless liquid having a smaller viscosity.

The same spreading of an ink droplet on different substrates, where a single inkjet ink would exhibit large differences in dot sizes, can be obtained by mixing the color inkjet ink with controlled amounts of a first colorless liquid containing no or substantially no surfactants and a second colorless liquid including a high concentration of one or more surfactants.

The mixing of a color inkjet ink and the two or more colorless liquids can be advantageously exploited for many purposes which may relate to:

image quality, e.g., dotsize, gloss, line quality and bleeding;

physical properties of the ink, e.g., viscosity, temperature, shelf-life stability, surface tension, drying time, curing speed, adhesion to a substrate, flexibility and hardness of an ink layer; and jetting performance of the printer, e.g., latency, pooling of the nozzle plate, failing nozzles, drop formation, and satellite formation.

Differences in gloss between the inkjet inks and the substrate usually lead to mediocre image quality. By adding a mixture in an appropriate ratio of two or more colorless liquids exhibiting different gloss values, the gloss of the inkjet ink-mixture can be matched with that of a specific substrate resulting in improved image quality. For a second substrate having a different gloss value, another ratio of the two or more colorless liquids exhibiting different gloss values has then to be selected.

The mixing of two or more colorless liquids with a color ink just prior to jetting can also be advantageously exploited to include security features for security documents. Usually a colorless liquid including a fluorescent compound, a phosphorescent compound, a thermochromic compound, an iridescent compound or magnetic particles is then used in the ink-mixture.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Definitions

Figure 1:
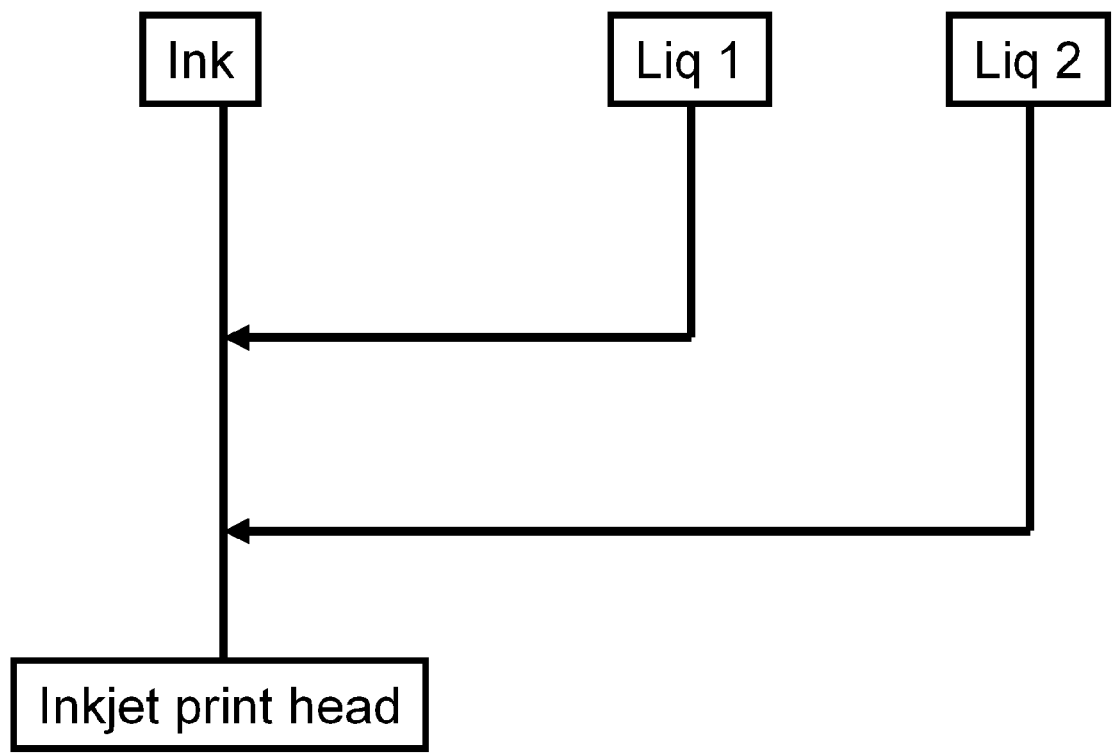
FIG. 1 is a schematic view of a system supplying an ink to the inkjet print head via a conduit wherein a first colorless liquid "LIQ-1" and consecutively a second colorless liquid "LIQ-2" are added in a controlled amount.

The term "inkjet ink set", as used in disclosing the present invention means an inkjet ink set as it is coupled to an inkjet printer. It can, for example, be made up from a commercially available CMYK inkjet ink set with which at least two colorless liquids are combined from another commercial source.

The term "colorant", as used in disclosing the present invention means dyes and pigments.

The term "dye", as used in disclosing the present invention means a colorant having a solubility of 10 mg/L or more in the medium in which it is applied and under the ambient conditions pertaining.

The term "pigment" is defined in DIN 55943, herein incorporated by reference, as a coloring agent that is practically insoluble in the application medium under the pertaining ambient conditions, hence having a solubility of less than 10 mg/L therein.

The term "C.I." is used in disclosing the present application as an abbreviation for Color Index.

The term "UV" is used in disclosing the present invention as an abbreviation for ultraviolet radiation.

The term "ultraviolet radiation" as used in disclosing the present invention means electromagnetic radiation in the wavelength range of 100 to 400 nanometers.

The term "wt %" is used in disclosing the present invention as an abbreviation for % by weight based upon the total weight of the ink unless otherwise specified.

The term "actinic radiation" as used in disclosing the present invention means electromagnetic radiation capable of initiating photochemical reactions.

The term "Norrish Type I initiator" as used in disclosing the present invention, means an initiator which cleaves after excitation, yielding the initiating radical immediately.

The term "Norrish Type II initiator" as used in disclosing the present invention, means an initiator which in its excited state forms free radicals by hydrogen abstraction or electron extraction from a second compound that becomes the actual initiating free radical. The second compound is called co-initiator or polymerization synergist. Synergists are compounds having a carbon atom with at least one hydrogen atom in the α-position then to a nitrogen atom.

The term "photo-acid generator" as used in disclosing the present invention means an initiator, which generates an acid or hemi-acid upon exposure to actinic radiation. A photo-acid generator is often also called a cationic initiator.

The term "thermal initiator" as used in disclosing the present invention means an initiator, which generates initiating species upon exposure to heat.

The term "alkyl" means all variants possible for each number of carbon atoms in the alkyl group i.e., for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

Inkjet Printing Methods and Ink Sets

The inkjet printing method according to a preferred embodiment of the present invention includes in order the steps of: a) providing to an inkjet printer at least two or more colorless liquids having a different composition and at least one color inkjet ink; b) mixing the color inkjet ink in a controlled amount with the two or more colorless liquids; and c) printing the ink-mixture of the color inkjet ink and the two or more colorless liquids with the inkjet printer onto an ink-receiver.

Although the possibilities of adapting the ink-mixture to a specific ink-receiver increases with the number of colorless liquids present in an ink set, many problems of image quality consistency and adhesion on different substrates can already be solved by using 2, 3, 4, 5 or 6 colorless liquids. In a preferred embodiment, the inkjet ink set includes three colorless liquids for handling all the different substrates.

For color printing, the inkjet ink set includes at least three color inkjet inks and preferable also a black inkjet ink. Usually the three color inkjet inks are a cyan ink, a magenta ink and a yellow ink. Red, green and blue inks are also sometimes used as an inkjet ink set or added to a CMYK inkjet ink set. The inkjet ink set according to the present invention should further include at least two or more colorless liquids. The two or more colorless liquids are preferably used to dilute all the color inks and the optional black inks with the same mixture of colorless liquids. For this reason, the consumption of colorless liquids is often higher than the consumption of colorless inks. In order to reduce the frequency of adding extra colorless liquids or of replacing colorless liquid cartridges, the volume of a colorless liquid in an inkjet ink set or in an inkjet printer is preferably larger than the volume of a color ink. Preferably the volume of a colorless liquid is at least 25%, more preferably at least 50% and most preferably at least 100% larger than the volume of a color ink.

In a preferred embodiment, the controlled amount wherein the color inkjet ink and the two or more colorless liquids are mixed includes a fixed ratio of percentage by weight of the color inkjet ink over the percentage by weight of the two or more colorless liquids. The ratio of percentage by weight of the color inkjet ink over the percentage by weight of the two or more colorless liquids is preferably between 9:1 and 2:3, more preferably between 8:2 and 1:1. For a ratio higher than 9:1, the amount of colorless liquids is often not large enough to be able to adapt the ink-mixture for having an improved property. For example, improved adhesion of radiation curable inkjet ink generally requires at least 25 wt % of another type of monomer. On the other hand, for a ratio smaller than 2:3, the effect of a mixing error on the image quality becomes significant.

In another preferred embodiment the printer may be set up for 2 or 3 "fixed ratio's" wherein the color management has already been determined for each fixed ratio. Depending on the ratio the printer can then switch from one color management to another. This can be useful, for example, if for a certain print job the color gamut is more important and the only characteristic to improve is the dotsize, then a higher fixed ratio can be selected by augmenting the surfactant concentration in one of the colorless liquids. The important issue is to use controlled amounts of the colorless liquids in a selected ratio with a corresponding color management in place.

The inkjet printing method may also use a so-called "multi-density" color inkjet ink set, including color inkjet inks of the same color but a different color density. For example, the color inkjet ink set may include a "dark magenta" inkjet ink and a "light magenta" inkjet ink. In a preferred embodiment, the multi-density inkjet ink set includes dark and light color inkjet inks for the colors magenta and cyan. Dark black and light black inks may also be present in a color inkjet ink set.

A preferred embodiment includes the printing of color inkjet ink diluted with controlled amounts of a first colorless liquid containing no or substantially no surfactants and a second colorless liquid including a high concentration of one or more surfactants. In this manner, the same spreading and dotsize of ink droplets on a wide range of different ink-receivers can be obtained.

Another preferred embodiment includes the printing of color inkjet ink diluted with controlled amounts of colorless liquids capable of improving the adhesion properties. The adhesion may be influenced by using different polymerizable compounds, surfactants, binders and/or organic solvents. If only one color inkjet ink and no colorless liquids are available in the color ink set, a compromise has to be sought whereby acceptable adhesion is obtained on several ink-receivers by making a complex mixture of ingredients, which frequently has a negative effect on the dispersion stability of a pigmented inkjet ink.

For example, it is known that the adhesion of radiation curable inks is promoted on polyvinyl chloride substrates when one or more monomers are used that are suitable for the swelling of the PVC substrate and which are selected from the group consisting of tetrahydrofurfuryl acrylate, 1,6-hexanediol diacrylate and N-vinyl caprolactam. However, adhesion on polycarbonate substrates is promoted when one or more monomers are used that are suitable for the swelling of the polycarbonate substrate and which are selected from the group consisting of propoxylated neopentyl glycol diacrylate, 2-phenoxylethyl acrylate, 2-(2-ethoxyethoxy)ethyl acrylate and polyethyleneglycol diacrylate. With the radiation curable inkjet printing method according to a preferred embodiment of the present invention, it is not necessary to make a "best possible" mixture of monomers suitable for both the swelling of polyvinyl chloride substrates and polycarbonate substrates. Instead, a dedicated monomer mixture can be prepared consisting predominantly of monomers, for example, for swelling polyvinyl chloride substrates if such a substrate is fed into the printer.

Inkjet Printer & Ink Supply Systems

Industrial inkjet printers generally include an ink supply system for supplying ink to an inkjet print head. Inkjet print heads produce drops either continuously or on demand. "Continuously" means that a continuous stream of ink drops is created, e.g., by pressurizing the ink supply. "On demand" differs from "continuous" in that ink drops are only ejected from a print head by manipulation of a physical process to momentarily overcome surface tension forces that keep the ink in the print head. The ink is held in a nozzle, forming a meniscus. The ink remains in place unless some other force overcomes the surface tension forces that are inherent in the liquid. The most common practice is to suddenly raise the pressure on the ink, ejecting it from the nozzle. One category of drop-on-demand inkjet print heads uses the physical phenomenon of electrostriction, a change in transducer dimension in response to an applied electric field. Electrostriction is strongest in piezoelectric materials and hence these print heads are referred to as piezoelectric print heads. The very small dimensional change of piezoelectric material is harnessed over a large area to generate a volume change that is large enough to squeeze out a drop of ink from a small chamber. A piezoelectric print head includes a multitude of small ink chambers, arranged in an array, each having an individual nozzle and a percentage of transformable wall area to create the volume changes required to eject an ink drop from the nozzle, in according with electrostriction principles.

In a preferred embodiment the inkjet printer is a drop-on-demand ink jet printing system having piezoelectric print heads for delivering droplets of a selectable color ink-mixture to an ink-receiver.

The inkjet ink is supplied to the ink ejecting chambers of a print head by an ink supply system that first conditions the ink in order to obtain smooth operation of the inkjet print head. Conditioning includes, for example, degassing of the ink and controlling the back-pressure at the nozzle.

It is known that the presence of air bubbles in the ink chamber of a piezoelectric print head often causes operational failure of the print head. If air is present in the ink chamber, intended pressure changes resulting from piezoelectric deformation of part of the ink chamber walls will be absorbed by the air, leaving the ink pressure unaffected. The surface tension force of the ink in the nozzle maintains the meniscus and no drops will be ejected from the ink chamber. At the frequencies at which piezoelectric transducers in piezoelectric print head are operated, i.e., in the kHz to MHz range, not only air bubbles but also dissolved air in the ink can cause operation failure as described above. In the prior art, concepts have been disclosed to avoid air bubbles in the ink chamber by creating an air trap upstream the ink chamber, i.e., prior to the ink entering the ink chamber. Solutions have been proposed in EP 714779 A (CANON) and U.S. Pat. No. 4,929,963 (HP) in the form of air buffers or gas separators that allow air bubbles to rise and evacuate from the ink in an intermediate tank before the ink is supplied to the print head.

A second point of attention in ink supply systems is the pressure at the nozzle, which is critical to a well-tuned and good operating print head. Inkjet print heads operate best at a slightly negative nozzle pressure or back-pressure. In practice this is often achieved by maintaining a height difference between the free ink surface in a vented ink supply tank and the meniscus in the nozzle. That is, the free ink surface in the vented supply tank is maintained gravimetrically a couple of centimeters below the level of the meniscus in the nozzle. This height difference established a hydrostatic pressure difference to control the back-pressure at the nozzle. In reciprocating print head configurations the ink supply tank is located off axis, i.e., not scanning, because otherwise the lowered position of ink supply tank versus the print head would interfere with the printing medium transport path. Flexible tubing is used to connect the off axis ink supply tank with the on axis print head, as disclosed in for example U.S. Pat. No. 4,929,963 (HP). During acceleration and deceleration of the print head, pressure waves are created in the tubes that may significantly disturb the pressure balance at the meniscus and may lead to weeping of the nozzle in the case of a decrease in negative pressure, or breaking of the meniscus in the case of an increase in negative pressure and taking air into the ink channel. Many approaches have been proposed to control the back-pressure in reciprocating print head applications. A back-pressure regulation mechanisms in the form of pressure buffers or dampers mounted together with the print head on the reciprocating carriage are disclosed in EP 1120257 A (SEIKO EPSON) and U.S. Pat. No. 6,485,137 (APRION DIGITAL). For accelerations and decelerations of the carriage above 1G the response time of these devices is insufficient. In EP 1142713 A (SEIKO EPSON) a vented subtank is used. The subtank serves as a local ink reservoir near the print head and is being filled intermittently from a main tank located off axis. The solution provides a better control of the nozzle back-pressure by maintaining a local hydrostatic pressure difference between the free ink surface of the vented subtank and the meniscus.

Ink Mixing Device

There are no real limitations for selecting the device to mix the color ink and the colorless liquids as long as they are made from materials compatible with the inks, e.g., solvent-resistant materials when solvent inkjet inks are to be mixed, and as long as an accurate mixing of the color ink and the colorless liquids is obtained. The dilution of the concentrated color inkjet ink with one or more colorless liquids should be accurately controlled to avoid varying concentrations of colorant in the ink causing inconsistent image quality.

In a preferred embodiment, an ink mixing device is selected capable of mixing the concentrated color inkjet ink and variable controlled amounts of two or more colorless liquids in a fixed ratio of percentage by weight of the color inkjet ink over the percentage by weight of the two or more colorless liquids.

The amounts of the concentrated color inkjet ink and two or more colorless liquids that are mixed can be chosen as desired. Preferably a larger amount of concentrated color inkjet ink will be diluted with smaller amounts of one or more colorless liquids. For example, a diluted radiation curable color inkjet ink may include 60 wt % of the concentrated color inkjet ink and 40 wt % of two or more colorless liquids depending on the selected type of ink-receiver. In a more preferred embodiment the diluted radiation curable color inkjet ink includes 70 wt % of the concentrated color inkjet ink and 30 wt % of two or more colorless liquids depending on the selected type of ink-receiver. In another preferred embodiment, the diluted radiation curable color inkjet ink includes 80 wt % of the concentrated color inkjet ink and 20 wt % of two or more colorless liquids depending on the selected type of ink-receiver.

The color ink and the colorless liquids can be mixed at various locations of the inkjet printer, for example, directly at the first connection of the inkjet inks and colorless liquids to the inkjet printer, near to the inkjet printheads or even inside the printheads. The smaller the distance between the location of the ink mixing and the printhead nozzles, the less ink is spilled for adapting to a new ink-receiver to be printed upon.

In one preferred embodiment, the ink mixing device has a compact design so that it is possible to incorporate it into a carriage including an assembly of print heads that moves back and forth along the fast scan direction.

Preferably, an ink mixing device is selected that does not introduce air bubbles into the ink-mixture.

For some inkjet inks, such as dye based inks, the ink mixing device may simply consist of conduits that come together in one conduit, which makes a number of sharp turns or V-turns in order to mix the color ink and the colorless liquids.

More complex ink mixing device may include pumps, valves, mixing chambers, etc.

If necessary, the ink mixing may be performed with cooling to prevent build up of heat. For radiation curable inkjet inks, the ink mixing is performed as much as possible under light conditions in which actinic radiation has been substantially excluded.

Figure 2:
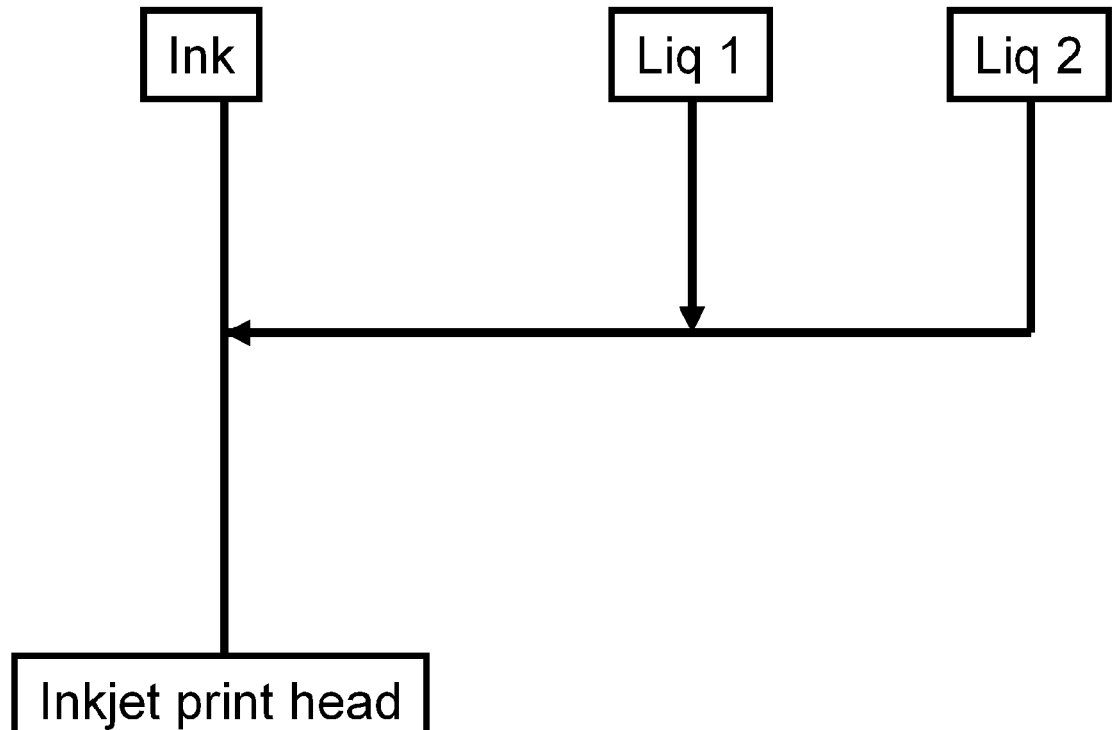
FIG. 2 is a schematic view of a system supplying an ink to the inkjet print head via a conduit wherein a mixture of a first colorless liquid "LIQ-1" and a second colorless liquid "LIQ-2" is added in a controlled amount

In one preferred embodiment, the color ink and the colorless liquids are supplied to an inkjet print head via a conduit wherein the ink-mixture is prepared in-situ in the conduit. A flow controller is adapted to selectably meter the colorless liquids from the colorless liquids sources into the conduit going from the source of the color inkjet ink to the ejecting chambers of the print head. Ink supply systems according to this preferred embodiment are exemplified by FIG. 1 and FIG. 2.

Figure 3:
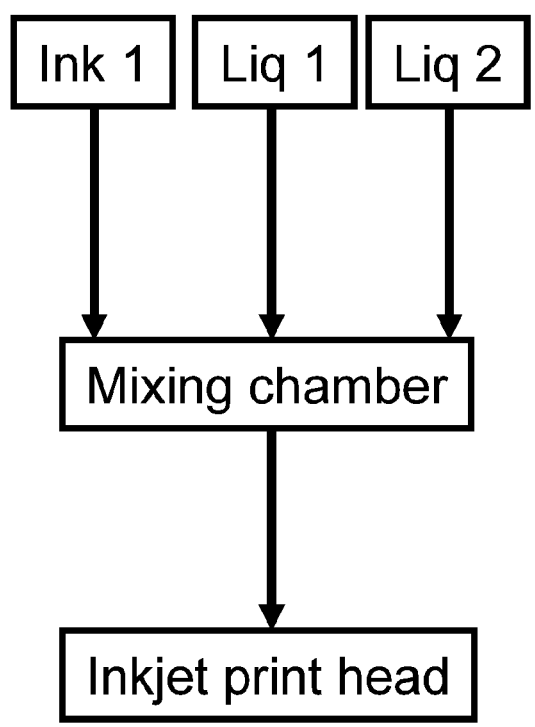
FIG. 3 is a schematic view of a system supplying controlled amounts of an ink, a first colorless liquid "LIQ-1" and a second colorless liquid "LIQ-2" to an ink mixing chamber which then delivers the diluted ink to the inkjet print head.

In another preferred embodiment, the ink supply system includes an ink mix chamber wherein the color ink and the colorless liquids are first mixed in a controlled amount before delivering this ink-mixture to the print head. An ink supply system according to this preferred embodiment is exemplified by FIG. 3.

Figure 4:
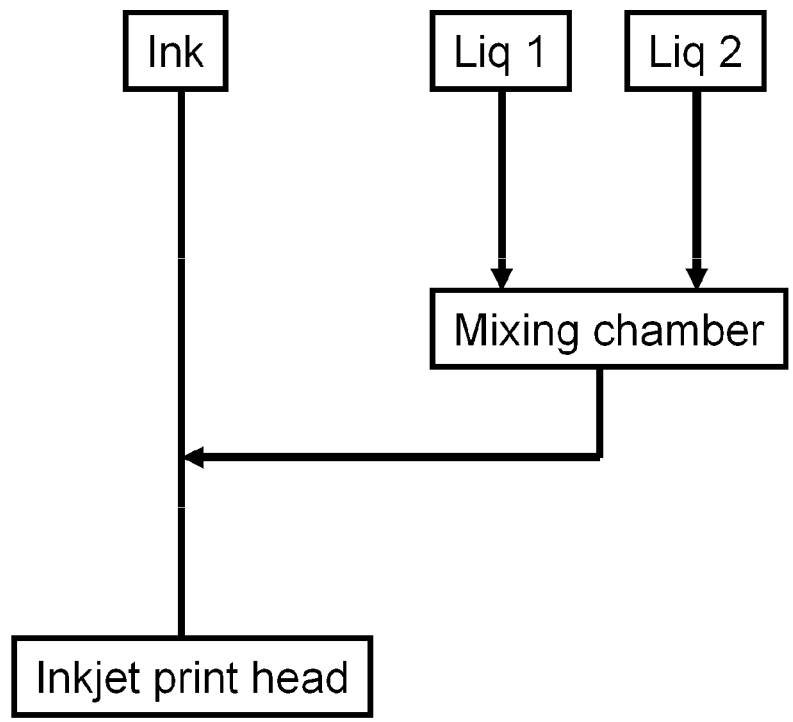
FIG. 4 is a schematic view of a system supplying an ink to the inkjet print head via a conduit wherein a mixture of a first colorless liquid "LIQ-1" and a second colorless liquid "LIQ-2" is mixed in a mixing chamber before adding it in a controlled amount to the ink in the conduit.

The two previous preferred embodiments can also be combined to provide an ink supply system wherein the colorless liquids are first mixed in a controlled amount in an ink mix chamber and then mixed in-situ with the color inkjet ink in the conduit between the ink color inkjet ink source and the print head. An ink supply system according to this preferred embodiment is exemplified by FIG. 4.

Figure 5:
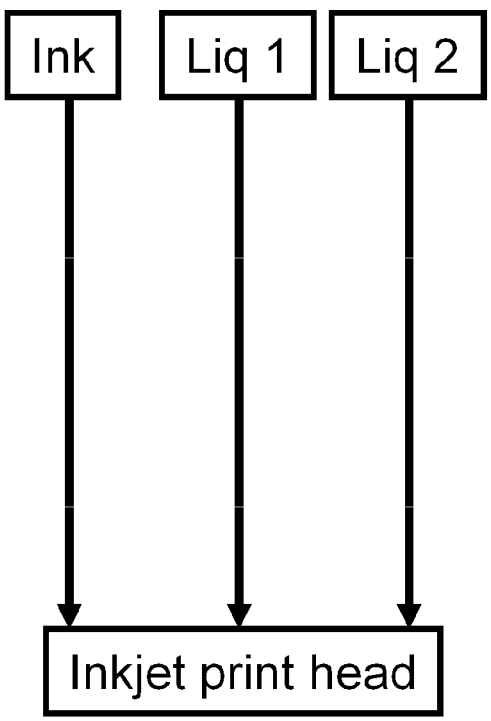
FIG. 5 is a schematic view of a system supplying controlled amounts of an ink, a first colorless liquid "LIQ-1" and a second colorless liquid "LIQ-2" to a mixing chamber (not shown) incorporated in the inkjet print head.

In another preferred embodiment the mixing in a controlled amount of the color ink and the colorless liquids occurs inside the print head. An ink supply system according to this preferred embodiment is exemplified by FIG. 5.

Although possible to locate (part of) the ink mixing system inside the print head, the ink mixing system is preferably separated from the print head. This allows connection of the ink supply system to a wide range of already commercially available print heads and inkjet printers, and hence does not increase the complexity and development cost of print heads. Moreover, the maintenance is much easier in an ink mixing system not located inside the print head when, for example, flocculation of the inks would occur.

It should be clear that for an ink set, a mixing device is preferably present for each color inkjet ink in the inkjet ink set.

Computing Device

In a preferred embodiment, the ink supply system is connected to a computer for controlling the ink mixing process. This may include the opening and closing of valves, the control of the flow by pumps, the rotation speed of a stirrer and other mechanical settings, to obtain the desired ink-mixture. However, the computer is preferably also used to store and recall data of ink-mixtures used on specific ink-receivers. This allows for fast adjustment of the inkjet printer to a specific ink-receiver which had already been printed upon with the same inkjet ink set in the past.

In another preferred embodiment, the computer may be used to produce a test pattern of different ink-mixtures on a not previously used ink-receiver which after examination of the printed pattern allows the selection of the ink-mixture exhibiting the desired properties of image quality, adhesion, etc. Employing this method each time a new substrate is used as ink-receiver results in a (digital) library of ink mixing data for specific ink-receivers. This ink mixing data includes the ratio of the color inkjet ink over the colorless liquids, the type and amounts of each colorless liquid used and their relation towards image quality and physical properties. The use of a library, more preferably a digital library, leads to enhanced productivity.

For a number of characteristic properties, it is possible to automate the evaluation of the test pattern of different ink-mixtures by including, downstream of the printer, a device capable of measuring or evaluating line width, edge straightness, mottle, print density, gloss and/or color intensity.

Inkjet Ink-Receivers

The ink-receiver suitable for the inkjet printing method according to the present invention is not restricted to any specific type and can be transparent, translucent or opaque. The ink-receiver may be colored or metallized. It can be a temporary substrate, e.g., for transferring an image to another substrate after printing. Applications such as 3D-printing, direct printing on wooden doors or panels and ceramics are also included.

Aqueous inks are generally printed on absorbing ink-receivers. Solvent based inkjet inks and radiation curable inks can also be printed on ink-receivers substantially non-absorbing for an aqueous solution. For example, standard paper is an absorbing ink-receiver. On the other hand, a resin-coated paper, e.g., polyethylene-coated paper or polypropylene-coated paper, is usually substantially non-absorbing.

The ink-receiver may include a support with at least one ink-receiving layer. The ink-receiving layer may consist of just one single layer, or alternatively it may be composed of two, three or more layers. The ink-receiving layer may contain one or more polymeric binders and optionally fillers. The ink-receiving layer, and an optional auxiliary layer, such as a backing layer for anti-curl and/or adhesive purposes, may further contain well-known conventional ingredients, such as surfactants serving as coating aids, cross-linking agents, plasticizers, cationic substances acting as mordant, light-stabilizers, pH adjusters, anti-static agents, biocides, lubricants, whitening agents and matting agents.

The ink-receiving layer and the optional auxiliary layer(s) may be cross-linked to a certain degree to provide such desired features as waterfastness and non-blocking characteristics. The cross-linking is also useful in providing abrasion resistance and resistance to the formation of fingerprints on the element as a result of handling.

Supports suitable for the ink-receiving layers are also suitable ink-receivers for solvent based inkjet inks or radiation curable inks and include polymeric substrates such as cellulose acetate propionate, cellulose acetate butyrate, polyesters such as polyethylene terephthalate (PET) and polyethylene naphthalate (PEN); oriented polystyrene (OPS); oriented nylon (ONy); polypropylene (PP), oriented polypropylene (OPP); polyvinyl chloride (PVC); and various polyamides, polycarbonates, polyimides, polyolefins, poly(vinylacetals), polyethers and polysulfonamides, opaque white polyesters and extrusion blends of polyethylene terephthalate and polypropylene. Acrylic resins, phenol resins, glass and metals may also be used as an ink-receiver. Other suitable ink-receiver materials can be found in Modern Approaches to Wettability: Theory and Applications, Edited by SCHRADER, Malcolm E., et al. New York: Plenum Press, 1992, ISBN 0306439859.

The ink-receiver may also incorporate mineral particles as fillers, such as, e.g., PET containing $CaCO_3$, PET containing $TiO_2$, amorphous PET (APET) and glycolized PET (PETG).

The ink-receiver may be provided with a self-adhesive backlayer. Examples of self-adhesive PVC ink-receivers include MPI™ vinyls from AVERY-DENNISON, DIGITAL™ vinyls from METAMARK, MULTI-FIX™ digital white vinyls from MULTI-FIX and GRAFIPRINT™ vinyls from GRAFITYP.

Polyester film substrates and especially polyethylene terephthalate are preferred for certain applications, particularly types with excellent dimensional stability. When such a polyester is used as the ink-receiver, a subbing layer may be employed to improve the bonding of the jetted ink layer to the substrate, if it constitutes together with the unsubbed substrate a substantially non-absorbing ink-receiver. Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers. Stabilizers, leveling additives, matting agents, adjusting agents for physical film properties such as waxes, may also be added to the subbing layer as required.

The ink-receiver may also be made from an inorganic material, such as a metal oxide or a metal (e.g., aluminium and steel).

Other suitable ink-receivers may be selected from the group consisting of cardboard, wood, composite boards, coated plastic, canvas, textile, glasses, plant fibre products, leather, magnetic materials and ceramics.

Inkjet Ink Sets

The inkjet ink set according to a preferred embodiment of the present invention includes at least one color inkjet ink and at least two or more colorless liquids, wherein the two or more colorless liquids have a different composition.

In the most preferred embodiment, the ink set includes a cyan, magenta, yellow and black inkjet ink.

In another preferred embodiment, the inkjet printing method uses a so-called "multi-density" inkjet ink set including color inkjet inks of the same color but a different color density. For example, the ink set may include a "dark magenta" inkjet ink and a "light magenta" inkjet ink. In another preferred embodiment the multi-density inkjet ink set includes dark and light inkjet inks for the colors magenta and cyan. Dark black and light black inks may also be present in an inkjet ink set. Other color inks such as green, red, blue, orange and white inks may also form part of the inkjet ink set.

In one preferred embodiment, the inkjet ink set includes an amount and/or a type of apolymerizable compound in a colorless liquid which differs from that in the color inkjet ink.

In another preferred embodiment, the inkjet ink set includes an amount and/or a type of a surfactant in a colorless liquid which differs from that in the color inkjet ink.

In another preferred embodiment, the inkjet ink set includes an amount and/or a type of an initiator in a colorless liquid which differs from that in the color inkjet ink.

In another preferred embodiment, the inkjet ink set includes an amount and/or a type of a polymerization synergist in a colorless liquid which differs from that in the color inkjet ink.

In a preferred embodiment the inkjet ink set includes solvent based inkjet inks.

In another preferred embodiment the inkjet ink set includes radiation curable inkjet inks. In a further preferred embodiment of a radiation curable inkjet ink set, a photo-initiator is present in the color inkjet ink and absent in the colorless liquids or vice versa. In another further preferred embodiment, a polymerization synergist is present in the color inkjet ink and absent in the colorless liquids or vice versa.

Color Inkjet Inks

The inkjet inks in an ink set according to a preferred embodiment of the present invention are preferably non-aqueous inkjet inks. In a non-aqueous inkjet ink the components are present in a dispersion medium which is a non-aqueous liquid at jetting temperature.

The term "non-aqueous liquid" refers to a liquid carrier which should contain no water. However sometimes a small amount, generally less than 5 wt % of water based on the total weight of the ink, can be present. This water was not intentionally added but came into the formulation via other components as a contamination, such as for example polar organic solvents. Higher amounts of water than 5 wt % tend to make the non-aqueous inkjet inks unstable, preferably the water content is less than 1 wt % based on the total weight dispersion medium and most preferably no water at all is present.

The inkjet inks of the inkjet ink set according to a preferred embodiment of the present invention preferably contain a pigment as colorant. If the colorant is not a self-dispersible pigment, the inkjet inks preferably also contain a dispersant, more preferably a polymeric dispersant.

The inkjet inks of an ink set according to a preferred embodiment of the present invention may further also contain at least one surfactant.

The inkjet inks of an ink set according to a preferred embodiment of the present invention may contain at least one humectant to prevent the clogging of the nozzle, due to its ability to slow down the evaporation rate of ink.

The pigmented color inkjet inks according to a preferred embodiment of the present invention may contain at least one dispersion synergist. A mixture of dispersion synergists may be used to further improve dispersion stability The inkjet inks of an ink set according to a preferred embodiment of the present invention is preferably an inkjet ink selected from the group consisting of an organic solvent based, an oil based and a curable inkjet ink. The curable inkjet ink is preferably radiation curable.

The viscosity of the inkjet ink is preferably smaller than 100 mPa·s at 30° C. and at a shear rate of $100\ s^{-1}$. The viscosity of the inkjet ink is preferably smaller than 30 mPa·s, more preferably lower than 15 mPa·s, and most preferably between 2 and 10 mPa·s at a shear rate of $100\ s^{-1}$ and a jetting temperature between 10 and 70° C.

The curable inkjet ink may contain as dispersion medium monomers, oligomers and/or prepolymers possessing different degrees of functionality. A mixture including combinations of mono-, di-, tri- and/or higher functionality monomers, oligomers or prepolymers may be used. A catalyst called an initiator for initiating the polymerization reaction may be included in the curable inkjet ink. The initiator can be a thermal initiator, but is preferably a photo-initiator. The photo-initiator requires less energy to activate than the monomers, oligomers and/or prepolymers to form the polymer. The photo-initiator suitable for use in the curable pigment dispersion may be a Norrish type I initiator, a Norrish type II initiator or a photo-acid generator.

The curable inkjet inks of an ink set according to a preferred embodiment of the present invention may further also contain at least one inhibitor.

A CMYK inkjet ink set may also be extended with one or more extra inks such as red, green, blue and orange to further enlarge the color gamut of the image. The CMYK ink set may also be extended by the combination of full density and light density inks of both color inks and/or black inks to improve the image quality by lowered graininess.

Colorants

The color inkjet inks of the inkjet ink set according to a preferred embodiment of the present invention contain at least one colorant. Colorants used in the inkjet inks may be pigments, dyes or a combination thereof. Organic and/or inorganic pigments may be used.

The radiation curable inkjet inks or solvent based inkjet inks preferably contain pigments as colorants.

The pigments in the inkjet inks may be black, white, cyan, magenta, yellow, red, orange, violet, blue, green, brown, mixtures thereof, and the like.

The color pigment may be chosen from those disclosed by HERBST, Willy, et al. Industrial Organic Pigments, Production, Properties, Applications, 3rd edition, Wiley—VCH, 2004, ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 180, 185 and 213.

Particular preferred pigments are C.I. Pigment Yellow 120, 151, 154, 175, 180, 181 and 194.

The most preferred yellow pigments are C.I. Pigment Yellow 120, 139, 150 155 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 270 and 272. For manufacturing decorative laminates, the most preferred are C.I. Pigment Red 254 and C.I. Pigment Red 266. For other non-aqueous inkjet applications the most preferred pigments are C.I. Pigment Red 122 and C.I. Pigment Violet 19.

Particular preferred pigments are C.I. Pigment Violet 1, 2, 19, 23, 32, 37 and 39.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. A commercially available example is Cinquasia Magenta RT-355-D from Ciba Specialty Chemicals.

Carbon black is preferred as a pigment for the black inkjet ink. Suitable black pigment materials include carbon blacks such as Pigment Black 7 (e.g., Carbon Black MA8® from MITSUBISHI CHEMICAL), REGAL® 400R, MOGUL® L, ELFTEX® 320 from CABOT Co., or Carbon Black FW18, Special Black 250, Special Black 350, Special Black 550, PRINTEX® 25, PRINTEX® 35, PRINTEX® 55, PRINTEX® 90, PRINTEX® 150T from DEGUSSA. Additional examples of suitable pigments are disclosed in U.S. Pat. No. 5,389,133 (XEROX).

It is also possible to make mixtures of pigments in the color inkjet inks. For some applications, a neutral black inkjet ink is preferred and can be obtained, for example, by mixing a black pigment and a cyan pigment into the ink. The inkjet application may also require one or more spot colors, for example for packaging inkjet printing or textile inkjet printing. Silver and gold are often desired colors for inkjet poster printing and point-of-sales displays.

Also non-organic pigments may be present in the color inkjet inks. Particular preferred pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e., pigments that are dispersible in the dispersion medium without dispersants.

Pigment particles in inkjet ink should be sufficiently small to permit free flow of the ink through the inkjet-printing device, especially at the ejecting nozzles. It is also desirable to use small particles for maximum color strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. However, the average pigment particle size for white inkjet inks including, for example, a titanium dioxide pigment, is preferably between 0.100 and 0.300 μm.

The pigment is preferably used in the pigment dispersion used for preparing the inkjet inks in an amount of 10 to 40 wt %, preferably 15 to 30 wt % based on the total weight of the pigment dispersion. In the inkjet ink the pigment is preferably used in an amount of 0.1 to 20 wt %, preferably 1 to 10 wt % based on the total weight of the inkjet ink.

Dyes suitable for the color inkjet inks in the ink set according to a preferred embodiment of the present invention include direct dyes, acidic dyes, basic dyes and reactive dyes.

Suitable direct dyes for the color inkjet inks include:
  C.I. Direct Yellow 1, 4, 8, 11, 12, 24, 26, 27, 28, 33, 39, 44, 50, 58, 85, 86, 100, 110, 120, 132, 142, and 144
  C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343
  C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237
  C.I. Direct Black 2, 3, 7, 17, 19, 22, 32, 38, 51, 56, 62, 71, 74, 75, 77, 105, 108, 112, 117, 154 and 195

Suitable acidic dyes for the color inkjet inks include:
  C.I. Acid Yellow 2, 3, 7, 17, 19, 23, 25, 20, 38, 42, 49, 59, 61, 72, and 99
  C.I. Acid Orange 56 and 64
  C.I. Acid Red 1, 8, 14, 18, 26, 32, 37, 42, 52, 57, 72, 74, 80, 87, 115, 119, 131, 133, 134, 143, 154, 186, 249, 254, and 256
  C.I. Acid Violet 11, 34, and 75
  C.I. Acid Blue 1, 7, 9, 29, 87, 126, 138, 171, 175, 183, 234, 236, and 249

C.I. Acid Green 9, 12, 19, 27, and 41

C.I. Acid Black 1, 2, 7, 24, 26, 48, 52, 58, 60, 94, 107, 109, 110, 119, 131, and 155

Suitable reactive dyes for the color inkjet inks include:

C.I. Reactive Yellow 1, 2, 3, 14, 15, 17, 37, 42, 76, 95, 168, and 175

C.I. Reactive Red 2, 6, 11, 21, 22, 23, 24, 33, 45, 111, 112, 114, 180, 218, 226, 228, and 235

C.I. Reactive Blue 7, 14, 15, 18, 19, 21, 25, 38, 49, 72, 77, 176, 203, 220, 230, and 235

C.I. Reactive Orange 5, 12, 13, 35, and 95

C.I. Reactive Brown 7, 11, 33, 37, and 46

C.I. Reactive Green 8 and 19

C.I. Reactive Violet 2, 4, 6, 8, 21, 22, and 25

C.I. Reactive Black 5, 8, 31, and 39

Suitable basic dyes for the color inkjet inks include:

C.I. Basic Yellow 11, 14, 21, and 32

C.I. Basic Red 1, 2, 9, 12, and 13

C.I. Basic Violet 3, 7, and 14

C.I. Basic Blue 3, 9, 24, and 25

If the color inkjet ink contains water, dyes can only manifest the ideal color in an appropriate range of pH value. Therefore, the inkjet ink preferably further includes a pH adjuster.

Suitable pH adjusters include NaOH, KOH, $NEt_3$, $NH_3$, HCl, $HNO_3$, $H_2SO_4$ and (poly)alkanolamines such as triethanolamine and 2-amino-2-methyl-1-propaniol. Preferred pH adjusters are NaOH and $H_2SO_4$.

The dyes are used in the color inkjet inks in an amount of 0.1 to 30 wt %, preferably 1 to 20 wt % based on the total weight of the inkjet ink.

In a specific preferred embodiment the colorant is a fluorescent colorant used to introduce security features. Suitable examples of a fluorescent colorant include TINOPAL™ grades such as TINOPAL™ SFD, UVITEX™ grades such as UVITEX™ NFW and UVITEX™ OB, all available from CIBA SPECIALTY CHEMICALS; LEUKOPHOR™ grades from CLARIANT and BLANCOPHOR™ grades such as BLANCOPHOR™ REU and BLANCOPHOR™ BSU from BAYER.

Dispersants

Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

statistically polymerized monomers (e.g., monomers A and B polymerized into ABBAABAB);

alternating polymerized monomers (e.g., monomers A and B polymerized into ABABABAB);

gradient (tapered) polymerized monomers (e.g., monomers A and B polymerized into AAABAABBABBB);

block copolymers (e.g., monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with side chains attached to the backbone); and mixed forms of these polymers, e.g., blocky gradient copolymers.

Polymeric dispersants may have different polymer architecture including linear, comb/branched, star, dendritic (including dendrimers and hyperbranched polymers). A general review on the architecture of polymers is given by ODIAN, George, Principles Of Polymerization, 4th edition, Wiley-Interscience, 2004, p. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multi-step synthesis), while hyperbranched polymers have a plurality of branch points and multifunctional branches that lead to further branching with polymer growth (one-step polymerization process).

Suitable polymeric dispersants may be prepared via addition or condensation type polymerizations. Polymerization methods include those described by ODIAN, George, Principles Of Polymerization, 4th edition, Wiley-Interscience, 2004, p. 39-606.

Addition polymerization methods include free radical polymerization (FRP) and controlled polymerization techniques. Suitable controlled radical polymerization methods include:

RAFT: reversible addition-fragmentation chain transfer;

ATRP: atom transfer radical polymerization

MADIX: reversible addition-fragmentation chain transfer process, using a transfer active xanthate;

Catalytic chain transfer (e.g., using cobalt complexes);

Nitroxide (e.g., TEMPO) mediated polymerizations;

Other suitable controlled polymerization methods include:

GTP: group transfer polymerization;

Living cationic (ring-opening) polymerizations;

Anionic co-ordination insertion ring-opening polymerization; and

Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN J. F. et al., Facile Synthesis of comb, star, and graft polymers via reversible addition-fragmentation chain transfer (RAFT) polymerization, Journal of Polymer Science, Part A: Polymer Chemistry, Vol. 40, 2956-2966, 2002.

Group transfer polymerization (GTP): the method of GTP used for synthesis of AB block copolymers is disclosed by SPINELLI, Harry J, GTP and its use in water based pigment dispersants and emulsion stabilisers, Proc. of 20th Int. Conf. Org. Coat. Sci. Technol., New Platz, N.Y., State Univ. N.Y., Inst. Mater. Sci. p. 511-518.

The synthesis of dendritic polymers is described in the literature. The synthesis of dendrimers in NEWCOME, G. R., et al. Dendritic Molecules: Concepts, Synthesis, Perspectives. VCH: WEINHEIM, 2001. Hyperbranching polymerization is described by BURCHARD, W. Solution properties of branched macromolecules. *Advances in Polymer Science*. 1999, vol. 143, no. II, p. 113-194. Hyperbranched materials can be obtained by polyfunctional polycondensation as disclosed by FLORY, P. J. Molecular size distribution in three-dimensional polymers. VI. Branched polymer containing A-R-Bf-1-type units. *Journal of the American Chemical Society*. 1952, vol. 74, p. 2718-1723.

Living cationic polymerizations is e.g., used for the synthesis of polyvinyl ethers as disclosed in WO 2005/012444

(CANON), US 20050197424 (CANON) and US 20050176846 (CANON). Anionic co-ordination ring-opening polymerization is, e.g., used for the synthesis of polyesters based on lactones. Living anionic ring-opening polymerization is, e.g., used for the synthesis of polyethylene oxide macromonomers.

Free radical Polymerization (FRP) proceeds via a chain mechanism, which basically consists of four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by combination).

Polymeric dispersants having several of the above polymer compositions are disclosed in U.S. Pat. No. 6,022,908 (HP), U.S. Pat. No. 5,302,197 (DU PONT) and U.S. Pat. No. 6,528,557 (XEROX).

Suitable statistical copolymeric dispersants are disclosed in U.S. Pat. No. 5,648,405 (DU PONT), U.S. Pat. No. 6,245,832 (FUJI XEROX), U.S. Pat. No. 6,262,207 (3M), US 20050004262 (KAO) and U.S. Pat. No. 6,852,777 (KAO).

Suitable alternating copolymeric dispersants are described in US 20030017271 (AKZO NOBEL).

Suitable block copolymeric dispersants have been described in numerous patents, especially block copolymeric dispersants containing hydrophobic and hydrophilic blocks. For example, U.S. Pat. No. 5,859,113 (DU PONT) AB block copolymers, U.S. Pat. No. 6,413,306 (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK) and U.S. Pat. No. 6,521,715 (DU PONT).

Suitable branched copolymeric dispersants are described U.S. Pat. No. 6,005,023 (DU PONT), U.S. Pat. No. 6,031,019 (KAO) and U.S. Pat. No. 6,127,453 (KODAK).

Suitable dendritic copolymeric dispersants are described in e.g., U.S. Pat. No. 6,518,370 (3M), U.S. Pat. No. 6,258,896 (3M), US 2004102541 (LEXMARK), U.S. Pat. No. 6,649,138 (QUANTUM DOT), US 2002256230 (BASF), EP 1351759 A (EFKA ADDITIVES) and EP 1295919 A (KODAK).

Suitable designs of polymeric dispersants for inkjet inks are disclosed in SPINELLI, Harry J., Polymeric Dispersants in Inkjet technology, *Advanced Materials*, 1998, Vol. 10, no. 15, p. 1215-1218.

The monomers and/or oligomers used to prepare the polymeric dispersant can be any monomer and/or oligomer found in the Polymer Handbook Vol. 1+2, 4th edition, edited by J. BRANDRUP et al., Wiley-Interscience, 1999.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable examples of monomers for synthesising polymeric dispersants include: acrylic acid, methacrylic acid, maleic acid (or there salts), maleic anhydride, alkyl(meth) acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth) acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g., oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrene sulfonic acid; (meth)acrylonitrile; (meth)acrylamides (including N-mono and N,N-disubstituted) such as N-benzyl (meth) acrylamide; maleimides such as N-phenyl maleimide; vinyl derivatives such as vinyl alcohol, vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate. Typical condensation type polymers include polyurethanes, polyamides, polycarbonates, polyethers, polyureas, polyimines, polyimides, polyketones, polyester, polysiloxane, phenol-formaldehyde, urea-formaldehyde, melamine-formaldehyde, polysulfide, polyacetal or combinations thereof.

Suitable copolymeric dispersants are acrylic acid/acrylonitrile copolymer, vinyl acetate/acrylic ester copolymer, acrylic acid/acrylic ester copolymer, styrene/acrylic acid copolymer, styrene/methacrylic acid copolymer, styrene/methacrylic acid/acrylic ester copolymer, styrene/α-methylstyrene/ acrylic acid copolymer, styrene/α-methylstyrene/acrylic acid/acrylic ester copolymer, styrene/maleic acid copolymer, styrene/maleic anhydride copolymer, vinylnaphthalene/ acrylic acid copolymer, vinylnapthalene/maleic acid copolymer, vinyl acetate/ethylene copolymer, vinyl acetate/fatty acid/ethylene copolymer, vinyl acetate/maleic ester copolymer, vinyl acetate/crotonic acid copolymer, vinyl acetate/ acrylic acid copolymer.

Suitable chemistries of copolymeric dispersants also include:
Copolymers which are the product of a condensation process of poly(ethylene imine) with a carboxylic acid terminated polyester (made by addition polymerization); and
Copolymers which are the product of a reaction of a multifunctional isocyanate with:
  a compound monosubstituted with a group that is capable of reacting with an isocyanate, e.g., polyester;
  a compound containing two groups capable of reacting with an isocyanate (cross-linker); or
  a compound with at least one basic ring nitrogen and a group that is capable of reacting with an isocyanate group.

A detailed list of suitable polymeric dispersants is disclosed by MC CUTCHEON, Functional Materials, North American Edition, Glen Rock, N.J.: Manufacturing Confectioner Publishing Co., 1990, p. 110-129.

Suitable pigment stabilisers are also disclosed in DE 19636382 (BAYER), U.S. Pat. No. 5,720,802 (XEROX), U.S. Pat. No. 5,713,993 (DU PONT), WO 96/12772 (XAAR) and U.S. Pat. No. 5,085,689 (BASF).

One polymeric dispersant or a mixture of two or more polymeric dispersants may be present to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant has preferably a polymerization degree DP between 5 and 1,000, more preferably between 10 and 500 and most preferably between 10 and 100.

The polymeric dispersant has preferably a number average molecular weight Mn between 500 and 30,000, more preferably between 1,500 and 10,000.

The polymeric dispersant has preferably an average molecular weight Mw smaller than 100,000, more preferably smaller than 50,000 and most preferably smaller than 30,000.

The polymeric dispersant has preferably a polymeric dispersity PD smaller than 2, more preferably smaller than 1.75 and most preferably smaller than 1.5.

Commercial examples of polymeric dispersants are the following:
DISPERBYK™ dispersants available from BYK CHEMIE GMBH;
SOLSPERSE™ dispersants available from NOVEON;
TEGO™ DISPERS™ dispersants from DEGUSSA;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH.

Particularly preferred dispersants for solvent based pigmented dispersions are SOLSPERSE™ 32000 and 39000 from NOVEON.

Particularly preferred dispersants for oil based pigmented dispersions are SOLSPERSE™ 11000, 11200, 13940, 16000, 17000 and 19000 from NOVEON.

Particularly preferred dispersants for UV-curable pigmented dispersions are SOLSPERSE™ 32000 and 39000 dispersants from NOVEON.

The polymeric dispersant is preferably used in an amount of 2 to 600 wt %, more preferably 5 to 200 wt % based on the weight of the pigment.

Dispersion Synergists

The dispersion synergist usually consists of an anionic part and a cationic part. The anionic part of the dispersion synergist exhibiting a certain molecular similarity with the color pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include SOLSPERSE™ 5000 and SOLSPERSE™ 22000 from NOVEON.

A particular preferred pigment for the magenta ink used in an inkjet ink set for manufacturing decorative laminates is a diketopyrrolo-pyrrole pigment. For obtaining excellent dispersion stability and quality, preferably a dispersion synergist was used for a diketopyrrolo-pyrrole pigment as those disclosed in pending European Patent Application EP05111360.

In dispersing C.I. Pigment Blue 15:3, the use of a sulfonated Cu-phthalocyanine dispersion synergist, e.g., SOLSPERSE™ 5000 from NOVEON is preferred. Suitable dispersion synergists for yellow inkjet inks include those disclosed in pending European Patent Application EP05111357.

Dispersion Media

In one preferred embodiment the dispersion medium consists of organic solvent(s). Suitable organic solvents include alcohols, ketones, esters, ethers, glycols and polyglycols and derivatives thereof, lactones, N-containing solvents such as amides. Preferably mixtures of one or more of these solvents are used.

Examples of suitable alcohols include methyl alcohol, ethyl alcohol, n-propyl alcohol, isopropyl alcohol, n-butyl alcohol, heptyl alcohol, octyl alcohol, cyclohexyl alcohol, benzyl alcohol, phenylethyl alcohol, phenylpropyl alcohol, furfuryl alcohol, anise alcohol and fluoroalcohols.

Examples of suitable ketones include acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone and isophorone, 2,4-pentanedione and hexafluoroacetone.

Examples of suitable esters include methyl acetate, ethyl acetate, n-propyl acetate, isopropyl acetate, n-butyl acetate, isobutyl acetate, hexyl acetate, octyl acetate, benzyl acetate, phenoxyethyl acetate, ethyl phenyl acetate, methyl lactate, ethyl lactate, propyl lactate, butyl lactate; methyl propionate, ethyl propionate, benzyl propionate, ethylene carbonate, propylene carbonate, amyl acetate, ethyl benzoate, butyl benzoate, butyl laurate, isopropyl myristate, isopropyl palmirate, triethyl phosphate, tributyl phosphate, diethyl phthalate, dibutyl phthalate, diethyl malonate, dipropyl malonate, diethyl succinate, dibutyl succinate, diethyl glutarate, diethyl adipate, dibutyl adipate and diethyl sebacate.

Examples of suitable ethers include butyl phenyl ether, benzyl ethyl ether, hexyl ether, diethyl ether, dipropyl ether, tetrahydrofuran and dioxane.

Examples of suitable glycols and polyglycols include ethylene glycol, diethylene glycol, triethylene glycol, propylene glycol, dipropylene glycol and tripropylene glycol.

Examples of suitable glycol and polyglycol derivatives include ethers such as alkylene glycol mono alkyl ethers, alkylene glycol dialkyl ethers, polyalkylene glycol monoalkyl ethers, polyalkylene glycol dialkyl ethers and esters of the preceding glycol ethers such as acetate and propionate esters, in case of dialkyl ethers only one ether function (resulting in mixed ether/ester) or both ether functions can be esterized (resulting in dialkyl ester).

Examples of suitable alkylene glycol mono alkyl ethers include ethylene glycol mono methyl ether, ethylene glycol mono ethyl ether, ethylene glycol mono propyl ether, ethylene glycol mono butyl ether, ethylene glycol mono hexyl ether, ethylene glycol mono 2-ethyl-hexyl ether, ethylene glycol mono phenyl ether, propylene glycol mono methyl ether, propylene glycol mono ethyl ether, propylene glycol mono n-propyl ether, propylene glycol mono n-butyl ether, propylene glycol mono iso-butyl ether, propylene glycol mono t-butyl ether and propylene glycol mono phenyl ether.

Examples of suitable alkylene glycol dialkyl ethers include ethylene glycol dimethyl ether, ethylene glycol diethyl ether, ethylene glycol methyl ethyl ether, ethylene glycol dibutyl ether, propylene glycol dimethyl ether, propylene glycol diethyl ether and propylene glycol dibutyl ether.

Examples of suitable polyalkylene glycol mono alkyl ethers include diethylene glycol mono methyl ether, diethylene glycol mono ethyl ether, diethylene glycol mono-n-propyl ether, diethylene glycol mono n-butyl ether, diethylene glycol mono hexyl ether, triethylene glycol mono methyl ether, triethylene mono ethyl ether, triethylene glycol mono butyl ether, dipropylene mono methyl ether, dipropylene glycol mono ethyl ether, dipropylene glycol n-propyl ether, dipropylene glycol mono n-butyl ether, dipropylene mono t-butyl ether, tripropylene glycol mono methyl ether, tripropylene glycol mono ethyl ether, tripropylene glycol mono n-propyl ether and tripropylene glycol mono n-butyl ether.

Examples of suitable polyalkylene glycol dialkyl ethers include diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methyl ethyl ether, triethylene glycol methyl ethyl ether, tetraethylene glycol methyl ethyl ether, diethylene glycol di-n-propyl ether, diethylene glycol di-iso-propyl ether, dipropylene glycol dimethyl ether, dipropylene glycol diethyl ether, dipropylene di n-propyl ether, dipropylene di t-butyl ether, tripropylene glycol dimethyl ether and tripropylene glycol diethyl ether.

Examples of suitable glycol esters include ethylene glycol monomethyl ether acetate, ethylene glycol monoethyl ether acetate, ethylene glycol monopropyl ether acetate, ethylene glycol monobutyl ether acetate, diethylene glycol monoethyl ether acetate, diethylene glycol monobutyl ether acetate, propylene glycol monomethyl ether acetate, propylene glycol monoethyl ether acetate, dipropylene glycol monomethyl ether acetate and propylene glycol monomethyl ether propionate.

Preferred solvents for use in pigment dispersions and inkjet inks are one or more polyalkyleneglycol dialkylethers represented by the formula (PAG)

Formula (PAG)

wherein,
$R_1$ and $R_2$ are each independently selected from an alkyl group having 1 to 4 carbon atoms;
Y represents an ethylene group and/or a propylene group; wherein
n is an integer selected from 4 to 20. Preferably a mixture of two or more polyalkyleneglycol dialkylethers represented by the formula (PAG).

The alkyl groups $R_1$ and $R_2$ of the polyalkyleneglycol dialkylethers according to Formula (PAG) preferably represent methyl and/or ethyl. Most preferably the alkyl groups $R_1$ and $R_2$ are both methyl groups.

In a preferred embodiment the polyalkyleneglycol dialkylethers according to Formula (PAG) are polyethylene glycol dialkylethers.

In another preferred embodiment, a mixture of 2, 3, 4 or more polyalkyleneglycol dialkylethers, more preferably polyethylene glycol dialkylethers are present in the pigment dispersion or inkjet ink.

Suitable mixtures of polyalkyleneglycol dialkylethers for the pigment dispersions include mixtures of polyethylene glycol dimethyl ethers having a molecular weight of at least 200, such as Polyglycol DME 200™, Polyglycol DME 250™ and Polyglycol DME 500™ from CLARIANT. The polyalkyleneglycol dialkylethers used in non-aqueous inkjet inks have preferably an average molecular weight between 200 and 800, and more preferably no polyalkyleneglycol dialkylethers with a molecular weight of more than 800 are present.

The mixture of polyalkyleneglycol dialkylethers is preferably a homogeneous liquid mixture at room temperature.

Suitable commercial glycol ether solvents include CELLOSOLVE™ solvents and CARBITOL™ solvents from UNION CARBIDE, EKTASOLVE™ solvents from EASTMAN, DOWANOL™ solvents from DOW, OXITOLL™ solvents, DIOXITOLL™ solvents, PROXITOLL™ solvents and DIPROXITOLL™ solvents from SHELL CHEMICAL and ARCOSOLV™ solvents from LYONDELL.

Lactones are compounds having a ring structure formed by ester bonds and can be of the γ-lactone (5-membered ring structure), δ-lactone (6-membered ring structure) or ε-lactone (7-membered ring structure) types. Suitable examples of lactones include γ-butyrolactone, γ-valerolactone, γ-hexylactone, γ-heptalactone, γ-octalactone, γ-nonalactone, γ-decalactone, γ-undecalactone, δ-valerolactone, δ-hexylactone, δ-heptalactone, δ-octalactone, δ-nonalactone, δ-decalactone, δ-undecalactone and ε-caprolactone.

Suitable examples of N-containing organic solvents include 2-pyrrolidone, N-methylpyrrolidone, N-ethyl-2-pyrrolidone, N-octyl-2-pyrrolidone, N-dodecyl-2-pyrrolidone, N,N-dimethylacetamid, N,N-dimethylformamid, acetonitril and N,N-dimethyldodecanamide.

In another preferred embodiment the dispersion medium includes oil types of liquids, alone or in combination with organic solvent(s). Suitable organic solvents include alcohols, ketones, esters, ethers, glycols and polyglycols and derivatives thereof, lactones, N-containing solvents such as amides, higher fatty acid ester and mixtures of one or more of the solvents as described above for solvent based dispersion media.

The amount of polar solvent is preferably lower than the amount of oil. The organic solvent has preferably a high boiling point, preferably above 200° C. Examples of suitable combinations are disclosed by GB 2303376 (FUJITSU ISOTEC) especially for the use of oleyl alcohol and EP 1157070 A (MARCONI DATA SYSTEMS) for the combination of oil and volatile organic solvent.

Suitable oils include saturated hydrocarbons and unsaturated hydrocarbons, aromatic oils, paraffinic oils, extracted paraffinic oils, napthenic oils, extracted napthenic oils, hydrotreated light or heavy oils, vegetable oils, white oils, petroleum naphtha oils, halogen-substituted hydrocarbons, silicones and derivatives and mixtures thereof.

Hydrocarbons may be selected from straight chain or branched chain aliphatic hydrocarbons, alicyclic hydrocarbons and aromatic hydrocarbons. Examples of hydrocarbons are saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,3,5,7-cyclooctatetraene; and cyclododecene; and aromatic hydrocarbons such as benzene, toluene, xylene, naphthalene, phenanthrene, anthracene and derivatives thereof. In literature the term paraffinic oil is often used. Suitable Paraffinic oils can be normal paraffin type (octane and higher alkanes), isoparaffins (isooctane and higher isoalkanes) and cycloparaffins (cyclooctane and higher cycloalkanes) and mixtures of paraffin oils. The term "liquid paraffin" is often used to refer to a mixture of mainly including three components of a normal paraffin, an isoparaffin and a monocyclic paraffin, which is obtained by highly refining a relatively volatile lubricating oil fraction through a sulphuric-acid washing or the like, as described in U.S. Pat. No. 6,730, 153 (SAKATA INX). Suitable hydrocarbons are also described as de-aromatized petroleum distillates.

Suitable examples of halogenated hydrocarbons include methylene dichloride, chloroform, tetrachloromethane and methyl chloroform. Other suitable examples of halogen-substituted hydrocarbons include perfluoro-alkanes, fluorine-based inert liquids and fluorocarbon iodides.

Suitable examples of silicone oils include dialkyl polysiloxane (e.g., hexamethyl disiloxane, tetramethyl disiloxane, octamethyl trisiloxane, hexamethyl trisiloxane, heptamethyl trisiloxane, decamethyl tetrasiloxane, trifluoropropyl heptamethyl trisiloxane, diethyl tetramethyl disiloxane), cyclic dialkyl polysiloxane (e.g., hexamethyl cyclotrisiloxane, octamethyl cyclotetrasiloxane, tetramethyl cyclotetrasiloxane, tetra(trifluoropropyl)tetramethyl cyclotetrasiloxane), and methylphenyl silicone oil.

White oil is a term used for white mineral oils, which are highly refined mineral oils that consist of saturated aliphatic and alicyclic non-polar hydrocarbons. White oils are hydrophobic, colorless, tasteless, odourless, and do not change color over time.

Vegetable oils include semi-drying oils such as soybean oil, cotton seed oil, sunflower oil, rape seed oil, mustard oil, sesame oil and corn oil; non-drying oils such as olive oil, peanut oil and tsubaki oil; and drying oils such as linseed oil and safflower oil, wherein these vegetable oils can be used alone or as a mixture thereof.

Examples of other suitable oils include petroleum oils, non-drying oils and semi-drying oils.

Commercially available suitable oils include the aliphatic hydrocarbons types such as the ISOPAR™ range (isoparaffins) and Varsol/Naphtha range from EXXON CHEMICAL, the SOLTROL™ range and hydrocarbons from CHEVRON PHILLIPS CHEMICAL, and the SHELLSOL™ range from SHELL CHEMICALS.

Suitable commercial normal paraffins include the NORPAR™ range from EXXON MOBIL CHEMICAL.

Suitable commercial napthenic hydrocarbons include the NAPPAR™ range from EXXON MOBIL CHEMICAL.

Suitable commercial de-aromatized petroleum distillates include the EXXSOL™ D types from EXXON MOBIL CHEMICAL.

Suitable commercial fluoro-substituted hydrocarbons include fluorocarbons from DAIKIN INDUSTRIES LTD, Chemical Division.

Suitable commercial silicone oils include the silicone fluid ranges from SHIN-ETSU CHEMICAL, Silicone Division.

Suitable commercial white oils include WITCO™ white oils from CROMPTON CORPORATION.

If the non-aqueous pigment dispersion is a curable pigment dispersion, the dispersion medium includes one or more monomers and/or oligomers to obtain a liquid dispersion medium. Sometimes, it can be advantageous to add a small amount of an organic solvent to improve the dissolution of the dispersant. The content of organic solvent should be lower than 20 wt % based on the total weight of the inkjet ink. In other cases, it can be advantageous to add a small amount of water, for example, to improve the spreading of the inkjet ink on a hydrophilic surface, but preferably the inkjet ink contains no water.

Preferred organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

In the case of a curable inkjet ink, the dispersion medium preferably consists of monomers and/or oligomers.

Monomers and Oligomers

Any monomer or oligomer may be used as curable compound for the curable inkjet ink. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the inkjet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is expensive and slow, especially under conditions of high relative humidity. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred for use as a radiation curable compound in the radiation curable inkjet ink are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, vinyl ether ethoxy (meth)acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaerythritol tetraacrylate, methoxylated glycol acrylates and acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, β-methylstyrene, p-methyl-β-methylstyrene, α-methylstyrene and p-methoxy-β-methylstyrene.

Suitable examples of vinylnaphthalene compounds are 1-vinylnaphthalene, α-methyl-1-vinylnaphthalene, β-methyl-1-vinylnaphthalene, 4-methyl-1-vinylnaphthalene and 4-methoxy-1-vinylnaphthalene.

Suitable examples of N-vinyl compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

The cationically polymerizable compound of the inkjet ink can be one or more monomers, one or more oligomers or a combination thereof.

Suitable examples of cationically curable compounds can be found in Advances in Polymer Science, 62, pages 1 to 47 (1984) by J. V. Crivello.

The cationic curable compound may contain at least one olefin, thioether, acetal, thioxane, thietane, aziridine, N-, O-, S- or P-heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

The cationically polymerizable monomer can be mono-, di- or multi-functional or a mixture thereof.

Suitable cationic curable compounds having at least one epoxy group are listed in the "Handbook of Epoxy Resins" by Lee and Neville, McGraw Hill Book Company, New York (1967) and in "Epoxy Resin Technology" by P. F. Bruins, John Wiley and Sons New York (1968).

Examples of cationic curable compounds having at least one epoxy group include 1,4-butanediol diglycidyl ether, 3-(bis(glycidyloxymethyl)methoxy)-1,2-propane diol, limonene oxide, 2-biphenyl glycidyl ether, 3,4-epoxycyclohexylmethyl-3',4'-epoxycyclohexane carboxylate, epichlorohydrin-bisphenol S based epoxides, epoxidized styrenics and more epichlorohydrin-bisphenol F and A based epoxides and epoxidized novolaks.

Suitable epoxy compounds including at least two epoxy groups in the molecule are alicyclic polyepoxide, polyglycidyl ester of polybasic acid, polyglycidyl ether of polyol, polyglycidyl ether of polyoxyalkylene glycol, polyglycidyl ester of aromatic polyol, polyglycidyl ether of aromatic polyol, urethane polyepoxy compound, and polyepoxy polybutadiene.

Examples of cycloaliphatic bisepoxides include copolymers of epoxides and hydroxyl components such as glycols, polyols, or vinyl ether, such as 3,4-epoxycyclohexylmethyl-3',4'-epoxycyclohexylcarboxylate; bis(3,4-epoxycylohexyl-methyl) adipate; limonene bisepoxide; diglycidyl ester of hexahydrophthalic acid.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, α-methylphenyl vinyl ether, β-methylisobutyl vinyl ether and β-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexylmethyl benzoate, bis[4-(vinyloxy)butyl]isophthalate, bis[4-(vinyloxymethyl)cyclohexylmethyl]glutarate, tris[4-(vinyloxy)butyl]trimellitate, 4-(vinyloxy)butyl steatite, bis[4-(vinyloxy)butyl]hexanediylbiscarbamate, bis[4-(vinyloxy)methyl]cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl](methylenedi-4,1-phenylene)biscarbamate and 3-amino-1-propanol vinyl ether.

Suitable examples of oxetane compounds having at least one oxetane group include 3-ethyl-3-hydroloxymethyl-1-oxetane, the oligomeric mixture 1,4-bis[3-ethyl-3-oxetanyl methoxy)methyl]benzene, 3-ethyl-3-phenoxymethyl-oxetane, bis ([1-ethyl(3-oxetanil)]methyl)ether, 3-ethyl-3-[(2-ethylhexyloxy)methyl]oxetane, 3-ethyl-[(tri-ethoxysilyl propoxy)methyl]oxetane and 3,3-dimethyl-2(p-methoxyphenyl)-oxetane.

A preferred class of monomers and oligomers which can be used in both radiation and cationically curable compositions are vinyl ether acrylates such as those described in U.S. Pat. No. 6,310,115 (AGFA), incorporated herein by reference. Particularly preferred compounds are 2-(2-vinyloxyethoxy) ethyl (meth)acrylate, most preferably the compound is 2-(2-vinyloxyethoxy)ethyl acrylate.

Initiators

The curable inkjet ink preferably also contains an initiator. The initiator typically initiates the polymerization reaction. The initiator can be a thermal initiator, but is preferably a photo-initiator. The photo-initiator requires less energy to activate than the monomers, oligomers and/or prepolymers to form the polymer. The photo-initiator suitable for use in the curable inkjet inks may be a Norrish type I initiator, a Norrish type II initiator or a photo-acid generator.

Thermal initiator(s) suitable for use in the curable inkjet ink include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

The photo-initiator or photo-initiator system absorbs light and is responsible for the production of initiating species, such as free radicals and cations. Free radicals and cations are high-energy species that induce polymerization of monomers, oligomers and polymers and with polyfunctional monomers and oligomers thereby also inducing cross-linking.

Irradiation with actinic radiation may be realized in two steps by changing wavelength or intensity. In such cases it is preferred to use 2 types of photo-initiator together.

A combination of different types of initiator, for example, a photo-initiator and a thermal initiator can also be used.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-halophenylglyoxalates.

A preferred Norrish type II-initiator is selected from the group consisting of benzophenones, thioxanthones, 1,2-diketones and anthraquinones. A preferred co-initiator is selected from the group consisting of an aliphatic amine, an aromatic amine and a thiol. Tertiary amines, heterocyclic thiols and 4-dialkylamino-benzoic acid are particularly preferred as co-initiator.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998, p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl)butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluorophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, Lucerin TPO available from BASF AG, ESACURE™ KT046, ESACURE™ KIP150, ESACURE™ KT37 and ESACURE™ EDB available from LAMBERTI, H-Nu™ 470 and H-Nu™ 470x available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e., co-initiators. Non-limiting examples of suitable cationic photo-initiators are aryldiazonium salts, diaryliodonium salts, triarylsulphonium salts, triarylselenonium salts and the like.

The curable inkjet ink may contain a photo-initiator system containing one or more photo-initiators and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable inkjet ink.

In order to increase the photosensitivity further, the curable inkjet ink may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable inkjet ink.

Suitable examples of co-initiators can be categorized in 4 groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate;
(3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate); and
(4) amides or ureas.

The preferred co-initiators are aminobenzoates.

A preferred initiator system is 2,2'-bis(o-chlorophenyl)-4,4',5,5'-tetraphenyl-(7CI,8CI) 4,4'-Bi-4H-imidazole corresponding to the chemical formula:

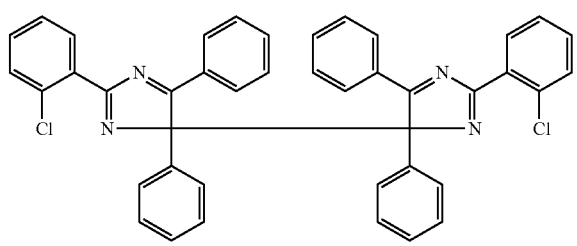 [SMILES: Clc1ccccc1C1=NC(c2ccccc2)(C2(c3ccccc3)N=C(c3ccccc3Cl)N=C2c2ccccc2)C(c2ccccc2)=N1]

in the presence of a co-initiator such as 2-mercapto benzoxazole.

Another preferred type of initiator is an oxime ester. A suitable example has as chemical formula:

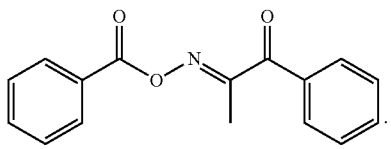 [SMILES: C/C(=N\OC(=O)c1ccccc1)C(=O)c1ccccc1]

A preferred amount of initiator is 0.3-50 wt % of the total weight of the curable liquid, and more preferably 1-15 wt % of the total weight of the curable inkjet ink.

Irradiation with actinic radiation may be realized in two steps by changing wavelength or intensity. In such cases it is preferred to use 2 types of photo-initiator together.

Inhibitors

Suitable polymerization inhibitors include phenothiazine, phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, SUMILIZER™ GA-80, SUMILIZER™ GM and SUMILIZER™ GS produced by Sumitomo Chemical Co., Ltd, Ciba Irgastab™ UV10 from CIBA Specialty Products and GENORAD™ 16 available from RAHN.

Since excessive addition of these polymerization inhibitors will lower the sensitivity to curing, it is preferred that the amount capable of preventing polymerization be determined prior to blending. The amount of a polymerization inhibitor is generally between 200 and 20,000 ppm of the total weight of the curable inkjet ink.

Surfactants

The surfactant(s) can be anionic, cationic, non-ionic, or zwitter-ionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink a fluorinated or silicone compound may be used as a surfactant, preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Binders

The color inkjet inks of the inkjet ink set according to the present invention may include a binder resin. The binder functions as a viscosity controlling agent and also provides fixability relative to a substrate, e.g., a polyvinyl chloride substrate. The binder preferably has a good solubility in the solvent(s).

Non-aqueous inkjet ink compositions preferably include a binder resin. The binder functions as a viscosity controlling agent and also provides fixability relative to the polymeric resin substrate, e.g., a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstylene copolymer resin. These binders may be used alone or in a mixture thereof. The binder is preferably a film-forming thermoplastic resin.

The amount of binder resin in inkjet ink is preferably in the range of 0.1 to 30 wt %, more preferably 1 to 20 wt %, most preferably 2 to 10 wt % based on the total weight of the inkjet ink.

Humectants

If the color inkjet inks contain organic solvents or water, preferably at least one humectant is present in the inks to prevent the clogging of the nozzle, due to its ability to slow down the evaporation rate of ink.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol. The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Other Additives

The color inkjet inks of the inkjet ink set according to the present invention may include other additives such as buffering agents, anti-mold agents, pH adjustment agents, electric conductivity adjustment agents, chelating agents, anti-rusting agents, light stabilizers, dendrimers, polymers, cross-linking agents, soluble electrolytes as conductivity aid, sequestering agents and chelating agents, compounds to introduce additional security features and the like. Such additives may be included in the color inkjet inks of the inkjet ink set according to the present invention in any effective amount, as desired.

Compounds to introduce additional security features include a fluorescent compound, a phosphorescent compound, a thermochromic compound, an iridescent compound and a magnetic particle. Suitable UV-fluorescent and phosphorescent compounds include LUMILUX™ luminescent pigments from HONEYWELL, UVITEX™ OB from CIBA-GEIGY, KEYFLUOR™ dyes and pigments from KEYSTONE and fluorescent dyes from SYNTHEGEN.

The color inkjet inks of the inkjet ink set according to a preferred embodiment of the present invention may further include conducting or semi-conducting polymers, such as polyanilines, polypyrroles, polythiophenes such as poly(ethylenedioxythiophene) (PEDOT), substituted or unsubstituted poly(phenylenevinylenes) (PPV's) such as PPV and MEH-PPV, polyfluorenes such as PF6, etc.

Preparation of Pigmented Inkjet Inks

The pigmented inkjet inks be prepared by precipitating or milling the pigment in the dispersion medium in the presence of the polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g., beads consisting essentially of a polymeric resin or yttrium stabilized zirconium oxide beads.

In the process of mixing, milling and dispersion, each process is performed with cooling to prevent build up of heat, and for radiation curable inkjet inks as much as possible under light conditions in which actinic radiation has been substantially excluded.

The inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical device and residence conditions selected, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g., for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, color, hue, saturation density, and print area coverage for the particular application.

Spectral Separation Factor

The spectral separation factor SSF was found to be an excellent measure to characterize a pigment inkjet ink, as it takes into account properties related to light-absorption (e.g., wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of e.g., a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $A_{max}$ over the absorbance $A_{ref}$ at a reference wavelength.

$$SSF = \frac{A_{max}}{A_{ref}}$$

The SSF is an excellent tool to design inkjet ink sets with large color gamut. Often inkjet ink sets are now commercialized, wherein the different inks are not sufficiently matched with each other. For example, the combined absorption of all inks does not give a complete absorption over the whole visible spectrum, e.g., "gaps" exist between the absorption spectra of the colorants. Another problem is that one ink might be absorbing in the range of another ink. The resulting color gamut of these inkjet ink sets is low or mediocre.

EXAMPLES

Materials

All materials used in the following examples were readily available from standard sources such as Aldrich Chemical Co. (Belgium) and Acros (Belgium) unless otherwise specified. The water used was deionized water.

BGA is butylglycolacetate.

NMP is N-methylpyrrolidone.

CINQUASIA™ Magenta RT-355-D is a quinacridone pigment from CIBA SPECIALTY CHEMICALS.

PB15:4 is an abbreviation used for HOSTAPERM™ Blue P-BFS, a cyan pigment (C.I. Pigment Blue 15:4) available from CLARIANT.

S35000 is an abbreviation used for SOLSPERSE™ 35000, a polyethyleneimine-polyester hyperdispersant from NOVEON.

GENORAD™ 16 is a polymerization inhibitor from RAHN AG.

DPGDA is dipropyleneglycoldiacrylate from SARTOMER.

GENOCURE™ EPD is ethyl 4-dimethylaminobenzoate from RAHN AG.

GENOCURE™ TPO is 2,4,6-trimethylbenzoyl-diphenylphosphineoxide from RAHN AG.

GENOCURE™ PBZ is 4-phenylbenzophenone, a photo-initiator from RAHN AG.

BYK™ UV3510 is a polyethermodified polydimethylsiloxane wetting agent from BYK CHEMIE GMBH.

Oracal 1640 is Oracal Blanc 1640 Print Vinyl, an adhesive polyvinylchloride substrate from ANTALIS.

Rayoart CGS 92 is a high gloss, two side coated clear, biaxially oriented polypropylene film from INNOVIA FILMS.

SeeMee Standard Easy is Seemee backlit standard easy, a double side coated PVC from VERSEIDAG-INDUTEX GMBH.

Fasson MC Primecoat S2000N is FASSON MC Primecoat/ 52000N/HF80, a white, one side machine coated, woodfree printing paper substrate from AVERY DENNISON.

Pripack Classic is Pripack classic is Pripack classic blanc et couleur, an extruded polypropylene film from ANTALIS.

Biprint 650 gr is Biprint blanc/couleur, a corona treated, polypropylene board from ANTALIS Measurement Methods 1. Measurement of SSF The spectral separation factor SSF of a pigmented ink was calculated by using the data of the recorded spectrum of an ink solution and comparing the maximum absorbance to the absorbance at a reference wavelength. The choice of this reference wavelength is dependent on the pigment(s) used:

if the color ink has a maximum absorbance $A_{max}$ between 400 and 500 nm then the absorbance $A_{ref}$ must be determined at a reference wavelength of 600 nm, If the color ink has a maximum absorbance $A_{max}$ between 500 and 600 nm then the absorbance $A_{ref}$ must be determined at a reference wavelength of 650 nm, If the color ink has a maximum absorbance $A_{max}$ between 600 and 700 nm then the absorbance $A_{ref}$ must be determined at a reference wavelength of 830 nm.

The absorbance was determined in transmission with a Shimadzu UV-2101 PC double beam-spectrophotometer. The ink was diluted to have a pigment concentration of 0.002%. In the case of a magenta ink, the ink was diluted to have a pigment concentration of 0.005%. A spectrophotometric measurement of the UV-VIS-NIR absorption spectrum of the diluted ink was performed in transmission-mode with a double beam-spectrophotometer using the settings of Table 1. Quartz cells with a path length of 10 mm were used and water was chosen as a blank.

TABLE 1

| Mode | Absorbance |
| --- | --- |
| Wavelength range | 240-900 nm |
| Slit width | 2.0 nm |
| Scan interval | 1.0 nm |
| Scan speed | Fast (1165 nm/min) |
| Detector | photo-multiplier(UV-VIS) |

Efficient pigmented inkjet inks exhibiting a narrow absorption spectrum and a high maximum absorbance have a value for SSF of at least 30.

2. Average Particle Size

The average particle size of pigment particles in a non-aqueous inkjet ink was determined with a Brookhaven Instruments Particle Sizer BI90plus based upon the principle of dynamic light scattering. The ink or dispersion was diluted with ethyl acetate to a pigment concentration of 0.002 wt %.

The measurement settings of the BI90plus were: 5 runs at 23° C., angle of 90°, wavelength of 635 nm and graphics=correction function.

For good ink jet characteristics (jetting characteristics and print quality) the average particle size of the dispersed particles should be less than 200 nm, preferably less than 150 nm.

3. Dispersion Stability

The dispersion stability was evaluated by comparing the particle size before and after a heat treatment of 7 days at 83° C. Pigmented inkjet inks exhibiting good dispersion stability have an in increase of the average particle size after heat treatment which is less than 10%.

4. Viscosity

The viscosity of the inkjet inks was measured using a Brookfield DV-II+ viscometer at 25° C. and shear rate of 4 RPM using a CPE 40 spindle.

5. Dotsize

The dotsize was measured with a CellCheck CNC-SLS (from M-Service & Geräte—Peter Müller, Germany) using a 150× microscope objective connected to a WAT-202B camera (from Watec Co., Ltd. Japan). An average of 5 dotsize measurements was calculated using the software Metric versie 8.02 Live (from M-Service & Geräte—Peter Müller, Germany).

6. Curing Speed

The percentage of the maximum output of the lamp was taken as a measure for curing speed, the lower the number the higher curing speed. A sample was considered as fully cured at the moment scratching with a Q-tip caused no visual damage.

7. Surface Energy of the Substrate

The Owens-Wendt equation was used for calculating the surface energy of a substrate $\sigma_S$ in the same manner as disclosed in US 2005190245 (AGFA).

8. Surface Tension

The surface tension of the inkjet inks was measured with a KRÜSS tensiometer K9 at 25° C. after 60 seconds.

9. Adhesion

Ink adhesion was tested by visual inspection of a lattice pattern that was manually scratched with a sharp needle pen into a UV cured ink layer. An evaluation was made in accordance with the degree of damage of the ink layer.

Criterion:
0=not damaged
1=very slightly damaged
2=slightly damaged
3=markedly damaged
4=extremely damaged.

10. Same Color and Same Density

In the context of this invention the following procedure was used to determine when two ink-mixtures are considered to have the same color and density.

Starting from the ink-mixture that was used in the printer, dilutions of 1:1000 in mass were prepared. It is evident that the solvent for the dilution must be compatible with the ink dispersion, i.e., the solvent should be chosen such that the chemical and physical dispersion stability is maintained, because otherwise color changes due to additional light scattering for example due to particle agglomerations might occur. Preferably, the dilution solvent is selected from one or more liquid components of the ink. In the examples given below, DPDGA was used as diluting solvent.

From the diluted ink dispersions transmission measurements [7] were collected with a spectrophotometer. Measurements were based on the following geometry: direct illumination and diffusely integrating detection. An example of such a spectrophotometer is the Double Beam Spectrophotometer Lambda 900 from Perkin Elmer realizing the measurement geometry ⊤(8/d) according to ASTM E179-96.

Quartz cuvettes with 10 mm optical path were filled with the diluted inks and then placed in contact to the entrance port of the integrating sphere. For the reference measurement, the same Quartz cuvette filled with the neat solvent was used. The transmission spectra of the diluted inks were divided by the transmission spectra of the reference measurement in order to correct for the diluting solvent and the Quartz cuvette. From these spectra the CIE L*a*b* coordinates were calculated according to ASTM E308-01 based on the CIE 1931 standard observer (2 deg) and D50 illuminant. From the CIE L*a*b* coordinates the CIE ΔE2000 Color Difference was calculated with the industry dependent parameters $K_L$, $K_C$ and $K_H$ set to unity (1).

In view of the application field of inkjet printing for which this invention is intended, two ink-mixtures A and B are regarded as having different color and density if CIE ΔE2000>5.0 is obtained for the given observer and illuminant, i.e., no spectral match is required.

If the color difference CIE ΔE2000 between ink-mixture A and ink-mixture B were larger than 5.0 typically a new characterization of the inkjet printing systems in terms of color management is required, whereas differences smaller than 2.0 might be compensated by a new linearization of the printer only. In that sense, two ink-mixtures A and B having a pair-wise color difference CIE ΔE2000 of smaller than or equal to 2.0 are regarded as having same color and density.

For more demanding printing applications, a color difference CIE ΔE2000 of smaller than or equal to 1.5 is required for same color and density. In an even more restrictive, colorimetric approach, same color and density is realized if the color difference CIE ΔE2000 is smaller than or equal to 1.0.

References

ASTM D2244-02 Standard Practice for Calculation of Color Tolerances and Color Differences from Instrumentally measured Color Coordinates
ASTM E179-96 (2003) Standard Guide for Selection of Geometric Conditions for Measurements of Reflection and Transmission Properties of Materials
ASTM E308-01 Standard Practice for Computing the Colors of Objects by Using the CIE system Example 1

This example illustrates how the same dotsize was obtained on different substrates using two curable liquids with a different surface tension.
Preparation of Inkjet Ink
A concentrated pigment dispersion P1 was prepared according to Table 2.

TABLE 2

| wt % of: | P1 |
|---|---|
| CINQUASIA ™ Magenta RT-355-D | 20.0 |
| SOLSPERSE ™ 35000 | 20.0 |
| GENORAD ™ 16 | 1.0 |
| DPGDA | 59.0 |

The concentrated pigment dispersion P1 was made by mixing 360.0 g of the pigment CINQUASIA™ Magenta RT-355-D, 36.0 g of a 50% solution of the inhibitor GENORAD™ 16 in DPGDA and 1028.6 g of a 35% solution of the polymeric dispersant SOLSPERSE™ 35000 in DPGDA for 30 minutes using a DISPERLUX™ Laboratory Dissolver YELLOW075 from DISPERLUX S.A.R.L., Luxembourg. The milling mixture was then milled at a rotation speed of 13 m/s and a flow rate of 0.6 L/min. under cooling by a NETZSCH™ LAB-STAR1 at a 54.4% volume filling with yttrium-stabilized zirconium oxide-beads of 0.4 mm diameter ("high wear resistant zirconia grinding media" from TOSOH Co.) and a residence time of 85 minutes. After milling the dispersion was separated from the beads using a filter cloth. The concentrated pigment dispersion P1 had an average particle size of 96 nm and a SSF of 60.

A curable magenta inkjet ink INK-1 was prepared from the concentrated pigment dispersion P1 by adding the remaining components under stirring at 20° C. to obtain a composition as shown in Table 3.

TABLE 3

| wt % of | INK-1 |
|---|---|
| Dispersion P1 | 25.00 |
| DPGDA | 49.00 |
| Genocure ™ TPO | 12.50 |
| Genocure ™ PBZ | 6.25 |
| Genocure ™ EPD | 6.25 |
| Genorad ™ 16 | 1.00 |

Printing and Evaluation
Table 4 shows the five different substrates and their surface energy which were selected for this example.

TABLE 4

| Substrate | Commercial tradename | Surface energy (mJ/m$^2$) |
|---|---|---|
| SUB-1 | Oracal 1640 | 39.0 |
| SUB-2 | Rayoart CGS 92 | 41.8 |
| SUB-3 | SeeMee Standard Easy | 45.6 |
| SUB-4 | Fasson MC Primecoat S2000N | 46.7 |
| SUB-5 | Pripack Classic | 60.0 |

The five substrates SUB-1 to SUB-5 were printed with ink-mixtures of the colorless liquids LIQ-1 and LIQ-2 of Table 5 with the curable magenta inkjet ink INK-1.

TABLE 5

| wt % of | LIQ-1 | LIQ-2 |
|---|---|---|
| DPGDA | 85.00 | 100.00 |
| BYK ™ UV 3510 | 15.00 | — |

Several ink-mixtures were made by mixing the curable inkjet ink INK-1 and the colorless liquids LIQ-1 and LIQ-2 according to Table 6 in order to obtain a desired print dotsize of 100 μm.

The ink-mixtures were printed with a custom build printer equipped with a fixed UPH™ printhead from AGFA with a distance between nozzle plate and ink-receiver of 1.0 mm. The inks were jetted at 5 dpd with a resolution of 360×360 dpi and in line cured using a 120 W DPL-lamp giving an exposure of 50 W at 400 mm/s. A final curing was given by passing the jetted image twice at 330 mm/s at an exposure of 50 W. The jet-to-cure-time was 1.3 seconds. The distance between the UV-lamp and the ink-receiver was 2.2 mm. The jetting temperature was 45° C.

The dotsizes obtained for the curable ink-mixtures are shown in Table 6.

TABLE 6

| Substrate | INK-MIXTURE | | | Surface tension (mN/m) | Dotsize (μm) |
| | INK-1 wt % | LIQ-1 wt % | LIQ-2 wt % | | |
| --- | --- | --- | --- | --- | --- |
| SUB-1 | 80.00 | 0.33 | 19.67 | 25.7 | 100 |
| SUB-2 | 80.00 | 6.67 | 13.33 | 22.4 | 97 |
| SUB-3 | 80.00 | 0.03 | 19.97 | 32.3 | 99 |
| SUB-4 | 80.00 | 0.67 | 19.33 | 25.7 | 100 |
| SUB-5 | 80.00 | 13.33 | 6.67 | 21.8 | 99 |

A very consistent image quality was obtained using the ink-mixtures according to Table 6 on the substrates SUB-1 to SUB-5, since all ink-mixtures delivered a dotsize of approximately 100 μm. It can be seen that there is no apparent relationship between the surface tension of the ink-mixture and the surface energy of the substrate on which it is printed. It should also be clear that it is not possible to obtain the same print dotsize with a single ink-mixture. This is exemplified in Table 8, where the ink-mixture of Table 6 used for printing on substrate SUB-2, was printed on the other substrates SUB-1 and SUB-3 to SUB-5. The broad range of print dotsizes obtained for this curable ink-mixture is shown in Table 7.

TABLE 7

| Substrate | INK-MIXTURE | | | Dotsize (μm) |
| | INK-1 wt % | LIQ-1 wt % | LIQ-2 wt % | |
| --- | --- | --- | --- | --- |
| SUB-1 | 80.00 | 6.67 | 13.33 | 164 |
| SUB-3 | 80.00 | 6.67 | 13.33 | 110 |
| SUB-4 | 80.00 | 6.67 | 13.33 | 119 |
| SUB-5 | 80.00 | 6.67 | 13.33 | 99 |

Example 2

This example illustrates a dotsize printing test on the substrates SUB-4 and SUB-6 (Biprint 650 gr) using a series of ink-mixtures based upon the same curable inkjet ink INK-1 and the colorless liquids LIQ-1 and LIQ-2 of EXAMPLE 1.

Printing and Evaluation

The resulting dotsizes for ink-mixtures 1 to 9 of the curable inkjet ink INK-1 and the colorless liquids LIQ-1 and LIQ-2 printed in the same manner as in EXAMPLE 1 is shown in Table 8.

TABLE 8

| No. | INK-MIXTURE | | | Surface tension (mN/m) | SUB-4 Dotsize (μm) | SUB-6 Dotsize (μm) |
| | INK-1 wt % | LIQ-1 wt % | LIQ-2 wt % | | | |
| --- | --- | --- | --- | --- | --- | --- |
| 1 | 80.00 | 0.00 | 20.00 | 35.1 | 105 | 76 |
| 2 | 80.00 | 0.03 | 19.97 | 32.3 | 95 | 68 |
| 3 | 80.00 | 0.07 | 19.93 | 27.4 | 96 | 71 |
| 4 | 80.00 | 0.33 | 19.67 | 25.7 | 100 | 69 |
| 5 | 80.00 | 0.67 | 19.33 | 25.7 | 100 | 70 |
| 6 | 80.00 | 3.33 | 16.67 | 23.0 | 112 | 73 |
| 7 | 80.00 | 6.67 | 13.33 | 22.4 | 119 | 87 |
| 8 | 80.00 | 13.33 | 6.67 | 21.8 | 123 | 158 |
| 9 | 80.00 | 20.00 | 0.00 | 21.8 | 124 | 175 |

From Table 8, it can be seen that for a dotsize of, for example, 120 μm that the ink-mixture No. 7 can be used on the substrate SUB-4. On substrate SUB-6 (Biprint 650 gr), the ink-mixture for a print dotsize of 120 μm lies somewhere between the ink-mixtures No. 7 and No. 8. To determine the exact composition of the ink-mixture required for SUB-6, a second dotsize printing test can be done in the range between the ink-mixtures No. 7 and No. 8, or it can be derived from a graph plotting the dotsize in function of the wt % of the colorless liquid LIQ-1. From such a graph, it was found that 9.60 wt % of LIQ-1 should be used with 10.40 wt % of LIQ-2 and 80 wt % of INK-1 all based upon the total weight of the ink-mixture.

The dotsize data in Table 8 make it also clear that the two substrates react quite differently on the ink-mixtures. This dotsize data obtained for specific ink-mixtures can be stored in a data library for future use of the same substrate. Such a library increases the productivity in an industrial printing environment as no time must be spent in adjusting ink and substrate for the desired spreading of the ink on the substrate.

Example 3

This example illustrates how improved adhesion was obtained for an ink-mixture of an inkjet ink and two colorless liquids, which would otherwise have unacceptable dispersion stability if prepared as such.

Preparation of Inkjet Ink

The concentrated pigment dispersion P2 was made by mixing 3750 g of the pigment PB15:4 and 9375 g of a 40% solution of the polymeric dispersant 535000 in BGA for 30 minutes using a DISPERLUX™ Dissolver from DISPERLUX S.A.R.L., Luxembourg. The dispersion was then milled under cooling with a DYNOMILL ECM Poly from Willy A. Bachofen AG Machinenfabrik filled with 20.521 kg of yttrium-stabilized zirconium oxide-beads of 0.4 mm diameter ("high wear resistant zirconia grinding media" from TOSOH Co.) for 4 hours and 23 minutes (residence time of 40 minutes) at a rotation speed of 14.7 m/s.

An inkjet ink INK-2 was prepared by diluting the pigment dispersion P2 with BGA to a concentration of 5.20 wt % of PB15:4 based upon the total weight of the ink. The inkjet ink INK-2 had an average particle size for PB15:4 of 137 nm. No increase of the particle size was observed after giving the ink INK-2 a heat treatment of 7 days at 83° C.

In a similar manner the inkjet inks INK-3 to INK-5 were prepared by diluting the pigment dispersion P2 with a mixture of BGA and NMP according to Table 9. An increase in average particle size was observed for the inks INK-4 and INK-5 containing a higher amount of N-methylpyrrolidone.

TABLE 9

| InkJet ink | Composition of ink | | | % increase of average particle size after 7 days at 83° C. |
| | P2 wt % | BGA wt % | NMP wt % | |
| --- | --- | --- | --- | --- |
| INK-2 | 50.0 | 50.0 | — | 0% |
| INK-3 | 25.0 | 65.0 | 10.0 | 0% |
| INK-4 | 25.0 | 55.0 | 20.0 | 16% |
| INK-5 | 25.0 | 45.0 | 30.0 | 24% |

Three ink-mixtures were prepared by mixing INK-2 with different ratios of LIQ-3 (BGA) and LIQ-4 (NMP) according to Table 10.

TABLE 10

| Ink-mixture | Composition of ink-mixture | | |
|---|---|---|---|
| | INK-2 wt % | LIQ-3 wt % | LIQ-4 wt % |
| MIX-1 | 50.0 | 40.0 | 10.0 |
| MIX-2 | 50.0 | 30.0 | 20.0 |
| INK-3 | 50.0 | 20.0 | 30.0 |

Table 11 gives an overview of the different ink compositions, together with the results for dispersion stability and the adhesion on a vinyl substrate, Avery MPI 3000.

TABLE 11

| Ink | Ink composition | | | | % increase particle size after 7 days at 83° C. | Adhesion |
|---|---|---|---|---|---|---|
| | PB15:4 | S35000 | BGA | NMP | | |
| INK-2 | 5.2 | 5.2 | 89.6 | — | 0% | 4 |
| INK-3 | 2.6 | 2.6 | 84.8 | 10 | 0% | 3 |
| INK-4 | 2.6 | 2.6 | 74.8 | 20 | 16% | 1 |
| INK-5 | 2.6 | 2.6 | 64.8 | 30 | 24% | 1 |
| MIX-1 | 2.6 | 2.6 | 84.8 | 10 | 0% | 3 |
| MIX-2 | 2.6 | 2.6 | 74.8 | 20 | 0% | 1 |
| MIX-3 | 2.6 | 2.6 | 64.8 | 30 | 0% | 1 |

Higher concentrations of the solvent N-methylpyrrolidone were found to improve the adhesion of the ink to a vinyl substrate. The shelf-life, simulated by the heat treatment of 7 days at 83° C., of the inks INK-4 and INK-5 prepared with NMP exhibited an increase in particle size of the pigment. By adding the solvent NMP as LIQ-4 just prior to jetting of the ink, the increase in particle size was avoided while the improved adhesion was obtained.

Example 4

This example illustrates the effect of not using a fixed ratio of percentage by weight of the color inkjet ink over the percentage by weight of the two or more colorless liquids. A color inkjet ink diluted with increasing amounts of colorless liquid in making ink-mixtures becomes noticeable in the printed image if no color management adaptations are performed.

As already mentioned, two ink-mixtures are regarded as having different color and density if CIE ΔE2000 is larger than 5.0. For most inkjet applications, such as wide format inkjet printing applications, differences in color and density of two inks can be allowable if the CIE ΔE2000 value is smaller than or equal to 2.0. The more critical an inkjet application is, usually determined by the viewing distance of an image, the smaller the CIE ΔE2000 value should be.

The CIE ΔE2000 was determined for ink-mixtures of the magenta ink INK-1 of EXAMPLE 1 with DPGDA. The results are given by Table 12.

TABLE 12

| % Dilution of INK-1 with DPGDA | CIE ΔE2000 |
|---|---|
| 0 | 0.0 |
| 5 | 1.0 |
| 10 | 1.9 |
| 15 | 2.8 |
| 20 | 3.5 |
| 25 | 4.4 |

For an inkjet application requiring a CIE ΔE2000 smaller than 2.0, a dilution of 10% may be tolerated for a cyan ink. However for high quality inkjet printing applications, the mixing errors of two or more inks should be lower than 5%, i.e., a value for CIE ΔE2000 of not more than 1.0.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A color inkjet ink set comprising:
   two or more colorless liquids having a different composition;
   at least one radiation curable color inkjet ink containing a colorant; wherein the colorant is a pigment; and
   the two or more colorless liquids and the at least one radiation curable color inkjet ink include a polymerizable compound, and an amount and/or type of the polymerizable compound in at least one of the two or more colorless liquids differs from an amount and/or type of the polymerizable compound in the at least one radiation curable color inkjet ink; wherein
   a surface tension of at least one of the two or more colorless liquids differs by more than 3.0 mN/m from a surface tension of the at least one radiation curable color inkjet ink.

2. The color inkjet ink set according to claim 1, wherein the color inkjet ink set comprises cyan, magenta, yellow, and black inkjet inks.

3. The color inkjet ink set according to claim 1, wherein the at least one radiation curable color inkjet ink includes a vinyl ether acrylate.

4. A color inkjet ink set comprising:
   two or more colorless liquids having a different composition;
   at least one radiation curable color inkjet ink containing a colorant; wherein
   the colorant is a pigment; and
   the two or more colorless liquids and the at least one radiation curable color inkjet ink include a polymerizable compound, and an amount and/or type of the polymerizable compound in at least one of the two or more colorless liquids differs from an amount and/or type of the polymerizable compound in the at least one radiation curable color inkjet ink; wherein
   a viscosity of at least one of the two or more colorless liquids differs by more than 5.0 mPa·s at 30° C. and at a shear rate of 100 s-1 from a viscosity of the at least one radiation curable color inkjet ink.

5. The color inkjet ink set according to claim 4, wherein the color inkjet ink set comprises cyan, magenta, yellow, and black inkjet inks.

6. The color inkjet ink set according to claim 4, wherein the at least one radiation curable color inkjet ink includes a vinyl ether acrylate.

7. A color inkjet ink set comprising:
two or more colorless liquids having a different composition;
at least one radiation curable color inkjet ink containing a colorant; wherein
the colorant is a pigment; and
the two or more colorless liquids and the at least one radiation curable color inkjet ink include a polymerizable compound, and an amount and/or type of the polymerizable compound in at least one of the two or more colorless liquids differs from an amount and/or type of the polymerizable compound in the at least one radiation curable color inkjet ink; wherein
the two or more colorless liquids and the at least one radiation curable color inkjet ink include an initiator, and an amount and/or type of the initiator in at least one of the two or more colorless liquids differs from an amount and/or type of the initiator in the at least one radiation curable color inkjet ink.

8. The color inkjet ink set according to claim 7, wherein the color inkjet ink set comprises cyan, magenta, yellow, and black inkjet inks.

9. The color inkjet ink set according to claim 7, wherein the at least one radiation curable color inkjet ink includes a vinyl ether acrylate.

10. A color inkjet ink set comprising:
two or more colorless liquids having a different composition;
at least one radiation curable color inkjet ink containing a colorant; wherein
the colorant is a pigment; and
the two or more colorless liquids and the at least one radiation curable color inkjet ink include a polymerizable compound, and an amount and/or type of the polymerizable compound in at least one of the two or more colorless liquids differs from an amount and/or type of the polymerizable compound in the at least one radiation curable color inkjet ink; wherein
the two or more colorless liquids and the at least one radiation curable color inkjet ink include a polymerization synergist, and an amount and/or type of the polymerization synergist in at least one of the two or more colorless liquids differs from an amount and/or type of the polymerization synergist in the at least one radiation curable color inkjet ink.

11. The color inkjet ink set according to claim 10, wherein the color inkjet ink set comprises cyan, magenta, yellow, and black inkjet inks.

12. The color inkjet ink set according to claim 10, wherein the at least one radiation curable color inkjet ink includes a vinyl ether acrylate.

* * * * *